(12) United States Patent
Mieda et al.

(10) Patent No.: US 11,990,253 B2
(45) Date of Patent: May 21, 2024

(54) INSULATING RESIN COMPOSITION AND PRODUCTION METHOD THEREFOR, INSULATING TAPE AND PRODUCTION METHOD THEREFOR, INSULATING LAYER FORMATION METHOD, AND POWER CABLE AND PRODUCTION METHOD THEREFOR

(71) Applicant: FURUKAWA ELECTRIC CO., LTD., Tokyo (JP)

(72) Inventors: Tetsuya Mieda, Tokyo (JP); Takahiro Kanaya, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 234 days.

(21) Appl. No.: 17/599,166
(22) PCT Filed: Mar. 30, 2020
(86) PCT No.: PCT/JP2020/014712
§ 371 (c)(1),
(2) Date: Sep. 28, 2021
(87) PCT Pub. No.: WO2020/204012
PCT Pub. Date: Oct. 8, 2020

(65) Prior Publication Data
US 2022/0157488 A1 May 19, 2022

(30) Foreign Application Priority Data
Mar. 29, 2019 (JP) .................................. 2019-069322

(51) Int. Cl.
*H01B 9/04* (2006.01)
*B29C 48/00* (2019.01)
(Continued)

(52) U.S. Cl.
CPC ......... *H01B 3/441* (2013.01); *B29C 48/0022* (2019.02); *B29C 48/022* (2019.02);
(Continued)

(58) Field of Classification Search
CPC .......... H01B 3/441; H01B 9/04; H01B 13/14; B29C 48/022; B29C 48/0022;
(Continued)

(56) References Cited

U.S. PATENT DOCUMENTS 10,752,758 B2 * 8/2020 Mohri ..................... C08L 23/06
2014/0155553 A1 * 6/2014 Shirodkar ........... C08L 23/0815
525/240
(Continued)

FOREIGN PATENT DOCUMENTS

CN 102725344 A 10/2012
CN 103665724 A 3/2014
(Continued)

OTHER PUBLICATIONS

Korean Office Action issued May 12, 2023 in Korean Patent Application No. 10-2021-7030952 (with English machine translation), citing document 15 therein, 24 pages.

(Continued)

*Primary Examiner* — William H. Mayo, III
(74) *Attorney, Agent, or Firm* — Oblon, McClelland, Maier & Neustadt, L.L.P.

(57) ABSTRACT

An insulating resin composition includes at least a base resin, and an antioxidant. The base resin includes a polyolefin resin modified with a polar group-containing molecule and an unmodified polyolefin resin. The polar group-containing molecule is at least one selected from an unsaturated dicarboxylic acid, an unsaturated dicarboxylic acid anhydride, and an unsaturated dicarboxylic acid anhydride derivative. The base resin has a sea-island structure including a first phase having the unmodified polyolefin resin and a second phase provided in the first phase and having the modified polyolefin resin. The second phase has an average diameter of 2 μm or less.

16 Claims, 5 Drawing Sheets

(51) Int. Cl.
  *B29C 48/08* (2019.01)
  *B29C 48/88* (2019.01)
  *B32B 15/08* (2006.01)
  *B32B 27/08* (2006.01)
  *B32B 27/20* (2006.01)
  *B32B 27/32* (2006.01)
  *C08J 5/18* (2006.01)
  *C08L 23/04* (2006.01)
  *H01B 3/44* (2006.01)
  *H01B 13/14* (2006.01)
  *B29L 7/00* (2006.01)

(52) U.S. Cl.
  CPC .......... *B29C 48/08* (2019.02); *B29C 48/9135* (2019.02); *B32B 15/08* (2013.01); *B32B 27/08* (2013.01); *B32B 27/20* (2013.01); *B32B 27/32* (2013.01); *C08J 5/18* (2013.01); *C08L 23/04* (2013.01); *H01B 9/04* (2013.01); *H01B 13/14* (2013.01); *B29K 2023/06* (2013.01); *B29K 2995/0007* (2013.01); *B29L 2007/007* (2013.01); *B32B 2264/108* (2013.01); *B32B 2307/206* (2013.01); *B32B 2307/732* (2013.01); *B32B 2457/00* (2013.01); *C08J 2323/04* (2013.01); *C08J 2423/26* (2013.01); *C08L 2203/202* (2013.01); *C08L 2205/02* (2013.01)

(58) Field of Classification Search
  CPC ..... B29C 48/08; B29C 48/9135; B32C 15/08; B32C 27/08; B32C 27/20; B32C 27/32; B32C 2264/108; B32C 2307/206
  USPC .................. 174/36, 110 R, 110 C, 113 R, 174/120 R–121 SR
  See application file for complete search history.

(56) References Cited

U.S. PATENT DOCUMENTS

| 2016/0071628 A1* | 3/2016 | Klimke | H01B 3/441 428/379 |
| 2016/0148717 A1* | 5/2016 | Kikuchi | H01B 1/24 252/511 |
| 2019/0375925 A1 | 12/2019 | Mohri et al. | |
| 2022/0157486 A1 | 5/2022 | Mieda et al. | |

FOREIGN PATENT DOCUMENTS

| CN | 107345013 A | 11/2017 | |
| EP | 2 922 068 A1 | 9/2015 | |
| EP | 3 951 807 A1 | 2/2022 | |
| JP | 9-252523 A | 9/1997 | |
| JP | 10-283851 A | 10/1998 | |
| JP | 11-86634 A | 3/1999 | |
| JP | 2004-363020 A | 12/2004 | |
| JP | 2922068 A1 * | 3/2015 | ............... H01B 3/44 |
| JP | 2015-148027 A | 8/2015 | |
| JP | 2018-024740 A * | 2/2018 | ........... H01B 1/0208 |
| JP | 2018-24740 A | 2/2018 | |
| JP | 2019-11448 A | 1/2019 | |
| WO | WO 2016/194743 A1 | 12/2016 | |
| WO | WO 2018/030160 A1 | 2/2018 | |

OTHER PUBLICATIONS

International Search Report mailed on Jun. 16, 2020 in PCT/JP2020/014712 filed on Mar. 30, 2020 (citing references AA and AQ-AT therein, 2 pages).
Notice of Reasons for Refusal issued on Nov. 4, 2020 in Japanese Patent Application No. 2020-544684, citing reference AU therein, 5 pages (with English translation).
Lee et al., "Preparation and Space Charge Accumulation Characteristics of Acrylate-grafted Polyethylenes Using Reaction Extrusion", IEEJ Transactions on Fundamentals and Materials, 1998, vol. 118-A, No. 10, pp. 1094-1100, total 15 pages (with English translation).
Office Action issued Feb. 22, 2022 in corresponding Indian Patent Application No. 202127048645 (with English Translation), 5 pages.
Extended European Search Report issued Nov. 24, 2022, in corresponding European Patent Application No. 20783526.5 citing documents 15 and 16 therein, 9 pages.
Combined Chinese Office Action and Search Report issued Dec. 14, 2022, in corresponding Chinese Patent Application No. 202080022409.7 (with English Translation) citing documents 15, 17-20 therein, 32 pages.
Hearing Notice issued on Sep. 5, 2023 in Indian Patent Application No. 202127048645, 3 pages.
Chinese Office Action issued on Sep. 28, 2023 in Chinese Patent Application No. 202080022409.7 (with English translation), 22 pages.

* cited by examiner

INSULATING RESIN COMPOSITION AND PRODUCTION METHOD THEREFOR, INSULATING TAPE AND PRODUCTION METHOD THEREFOR, INSULATING LAYER FORMATION METHOD, AND POWER CABLE AND PRODUCTION METHOD THEREFOR

TECHNICAL FIELD

The present invention relates to an insulating resin composition; a method of producing the insulating resin composition; an insulating tape that is for use in covering a connection portion of a power cable and produced using the insulating resin composition; a method of producing the insulating tape; a method of forming an insulating layer on the outer surface of a connection portion of a power cable using the insulating tape; a power cable having an insulating layer formed using the insulating resin composition; and a method of producing the power cable.

BACKGROUND ART

A cable (power cable) widely used for transmission and distribution of electric power includes a conductor and an insulating layer that covers the outer circumference of the conductor and includes cross-linked polyolefin resin such as cross-linked polyethylene resin. Unfortunately, cross-linked polyolefin resin in the insulating layer of such a power cable is known to degrade over time due to accumulation of space charges in its interior and to tend to undergo breakdown due to the degradation. To prevent the power cable from undergoing breakdown, therefore, it is preferred to reduce the amount of space charges accumulated in the insulating layer.

A method for reducing the amount of space charges accumulated in the insulating layer may be a method of modifying the polyolefin resin used to form the insulating layer. More specifically, such a method may be a method of adding an electric field stabilizer or a treeing resistant additive to the polyolefin resin; a method of blending two or more polymers; or a method of developing a new material through grafting, onto a polyethylene chain, a monomer with a suitable polar group or modifying the polymerization process to copolymerize a polyethylene chain with other polymers (see, for example, Non-Patent Document 1).

Regarding the method of adding an electric field stabilizer or a treeing resistant additive to polyolefin, for example, Patent Document 1 discloses a direct-current (DC) cable having an insulating layer including a cross-linked polyethylene material containing a polar inorganic filler, such as magnesium oxide, in which the polar inorganic filler is a product produced by surface-treating the polar inorganic material with a surface treatment agent and pulverizing the resulting material into particles with a size substantially equal to the particle size of the polar inorganic material provided before the surface treatment. Moreover, magnesium oxide is added to prevent a decrease in volume resistivity, which is caused by a residue resulting from decomposition of an organic peroxide cross-linking agent, such as dicumyl peroxide (DCP), or to suppress the accumulation of space charges, so that the insulating layer has improved DC insulation properties.

Regarding the method of grafting, onto a polyethylene chain, a monomer with a suitable polar group, for example, Patent Document 2 discloses an alternate-current (AC) power cable having an insulator including maleic anhydride-grafted polyethylene with a density of 0.93 g/cm³ or more and a maleic anhydride concentration of 0.01 to 5% by weight. Moreover, the maleic anhydride-grafted polyethylene is diluted with polyethylene so that carbonyl groups are added in an adequate amount to the insulating resin to act as space charge traps, which suppress the space charge transfer and prevent DC breakdown, which would otherwise be caused by local accumulation of space charges.

Patent Document 1: Japanese Unexamined Patent Application, Publication No. H11-086634
Patent Document 2: Japanese Unexamined Patent Application, Publication No. 2004-363020
Non-Patent Document 1: LEE Chang-Ryong and two others, The transactions of the Institute of Electrical Engineers of Japan, A, A publication of Fundamentals and Materials Society No. 118, Vol. 10, 1998, pp. 1094-1100

DISCLOSURE OF THE INVENTION

Problems to be Solved by the Invention

The DC cable disclosed in Patent Document 1, which contains an inorganic filler added to the resin in the insulating layer and having a specific gravity higher than that of the resin, has a problem not only in that the cable is relatively heavy and thus low in handleability for use but also in that the cable may contain huge filler particles with a size of 100 μm or more and thus easily undergo breakdown.

The AC power cable disclosed in Patent Document 2 also has a problem in that, if the resin is insufficiently kneaded during the dilution of the maleic anhydride-grafted polymer, the polar groups may be non-uniformly distributed in the resin composition, so that variations may occur in the amount of space charges accumulated in the insulating layer and breakdown may easily occur at a portion with a small amount of the carbonyl groups. Moreover, if the resin temperature during the kneading or the rotation speed of the extruder screw is increased to increase the uniformity, a problem may arise in that shear heating may occur to cause abnormal cross-linking of the resin, which makes the molding difficult.

It is an object of the present invention to provide an insulating resin composition capable of forming an insulating layer less vulnerable to accumulation of space charges and thus less vulnerable to breakdown; a method of producing such an insulating resin composition; an insulating tape that is for use in covering a connection portion of a power cable and produced using such an insulating resin composition; a method of producing such an insulating tape; a method of forming an insulating layer on the outer surface of a connection portion of a power cable using such an insulating tape; a power cable having an insulating layer formed using such an insulating resin composition; and a method of producing such a power cable.

Means for Solving the Problems

As a result of intensive studies, the present inventors have completed the present invention based on findings that, when an insulating layer for a power cable is produced using a polyolefin modified with a polar group-containing molecule, what is called a sea-island structure including: a first phase including an unmodified polyolefin resin; and a second phase provided in the first phase and including a modified polyolefin resin should be formed so that the amount of space charges accumulated in the insulating layer can be more effectively reduced.

Specifically, the present invention has the following principal features.

(1) An insulating resin composition including at least: a base resin; and an antioxidant, the base resin including: a polyolefin resin modified with a polar group-containing molecule; and an unmodified polyolefin resin, the polar group-containing molecule, with which the polyolefin resin is modified, being at least one selected from an unsaturated dicarboxylic acid, an unsaturated dicarboxylic acid anhydride, and an unsaturated dicarboxylic acid anhydride derivative, the base resin having what is called a sea-island structure including: a first phase including the unmodified polyolefin resin; and a second phase provided in the first phase and including the modified polyolefin resin, the second phase having an average diameter of 2 μm or less.

(2) An insulating tape for use in forming an insulating layer for a power cable, the insulating tape including the insulating resin composition according to aspect (1) as a raw material, the insulating tape having a thickness in the range of 30 μm or more and 250 μm or less and a width in the range of 3 mm or more and 40 mm or less.

(3) A power cable including: a conductor; and a composite coating on the outer circumference of the conductor, the composite coating including: an inner semiconducting layer including a first electrically-conductive resin; an insulating layer made from the insulating resin composition according to aspect (1) as a raw material and including a cross-linking reaction product of at least the modified polyolefin resin in the second phase and a cross-linking reaction product of at least the unmodified polyolefin resin in the first phase; and an outer semiconducting layer including a second electrically-conductive resin, the inner semiconducting layer, the insulating layer, and the outer semiconducting layer being stacked in order on the outer circumference of the conductor.

(4) A power cable including: a connection structure comprising: a connection portion; and a composite coating on the outer circumference of the connection portion, the connection portion including exposed end portions of conductors of multiple power cables, the exposed end portions being conductively connected together, the composite coating including: an inner semiconducting layer including a first electrically-conductive resin; an insulating layer made from the insulating resin composition according to aspect (1) as a raw material and including a cross-linking reaction product of at least the modified polyolefin resin in the second phase and a cross-linking reaction product of at least the unmodified polyolefin resin in the first phase; and an outer semiconducting layer including a second electrically-conductive resin, the inner semiconducting layer, the insulating layer, and the outer semiconducting layer being stacked in order on the outer circumference of the connection portion.

(5) The power cable according to aspect (4), wherein the insulating layer includes an insulating layer-forming insulating tape that has a thickness in the range of 30 μm or more and 250 μm or less and a width in the range of 3 mm or more and 40 mm or less, is wound around the outer circumference of the inner semiconducting layer, and has undergone cross-linking.

(6) The power cable according to any one of aspects (3) to (5), wherein the inner semiconducting layer and the outer semiconducting layer have a total thickness of 5 mm or less.

(7) A method of producing an insulating resin composition, the method including: adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated dicarboxylic acid anhydride derivative; and kneading the unmodified polyolefin resin, the antioxidant, and the modified polyolefin resin to obtain a base resin that includes a dilution of the modified polyolefin resin with the unmodified polyolefin resin and has what is called a sea-island structure including: a first phase including the unmodified polyolefin resin; and a second phase provided in the first phase and including the modified polyolefin resin, wherein the second phase has an average diameter of 2 μm or less.

(8) A method of producing an insulating resin composition, the method including: adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated dicarboxylic acid anhydride derivative to prepare diluted polyolefin pellets including a base resin including a dilution of the modified polyolefin resin with the unmodified polyolefin resin; then adding a cross-linking agent to the diluted polyolefin pellets; and subjecting the cross-linking agent and the diluted polyolefin pellets to dry blending such that the base resin has what is called a sea-island structure including: a first phase including the unmodified polyolefin resin; and a second phase provided in the first phase and including the modified polyolefin resin and the second phase has an average diameter of 2 μm or less.

(9) A method of producing an insulating tape for use in forming an insulating layer for a power cable, the method including: extruding the insulating resin composition according to aspect (1) into a film; cooling the surface of the film to a temperature equal to or lower than the melting point of the unmodified polyolefin resin within 15 seconds after the extrusion of the insulating resin composition; and subjecting the film to slitting to form tapes.

(10) A method of forming an insulating layer on an outer surface of a connection portion of a power cable, the method including: depositing the insulating resin composition according to aspect (1) on the outer circumference of a connection portion to form an insulating layer on the outer surface of the connection portion, the connection portion including exposed end portions of conductors of multiple power cables, the exposed end portions being conductively connected together; and subjecting the connection portion with the insulating layer to pressure heating under conditions at 300 kPa or more and 1,000 kPa or less and at 140° C. or more and 280° C. or less to cross-link the unmodified polyolefin resin and the modified polyolefin resin in the base resin in the insulating layer.

(11) The method according to aspect (10), wherein the insulating layer is formed on the outer circumference of the connection portion by winding an insulating layer-forming insulating tape including the insulating resin composition as a raw material and having a thickness in the range of 30 μm or more and 250 μm or less and a width in the range of 3 mm or more and 40 mm or less.

(12) A method of producing a power cable, the method including: stacking an inner semiconducting layer, an insulating layer, and an outer semiconducting layer in order on the outer circumference of a conductor; and cross-linking at least the insulating layer, wherein the insulating layer is stacked by extruding the insulating resin composition according to aspect (1) onto the outer circumference of the inner semiconducting layer, the surface of the stacked insulating layer is cooled to a temperature equal to or lower than the melting point of the unmodified polyolefin resin within 15 seconds after the extrusion onto the outer circumference of the inner semiconducting layer, and the insulating layer is cross-linked by subjecting the insulating layer to pressure heating under conditions at 300 kPa or more and 1,000 kPa or less and at 140° C. or more and 280° C. or less to cross-link the unmodified polyolefin resin and the modified polyolefin resin in the base resin in the insulating layer.

Effects of the Invention

The insulating resin composition according to the present invention has what is called a sea-island structure including: a first phase (sea phase) including an unmodified polyolefin resin; and a second phase (island phase) provided in the first phase and including a modified polyolefin resin and also has a very small second phase (island phase) size of 2 μm or less. These features reduce the biased distribution of polar groups and thus reduce the amount of space charges accumulated in the insulating resin composition. Therefore, it is possible to provide an insulating resin composition less vulnerable to breakdown; a method of producing such an insulating resin composition; an insulating tape produced using such an insulating resin composition; a method of producing such an insulating tape; a method of forming an insulating layer using such an insulating tape; a power cable produced using such an insulating resin composition; and a method of producing such a power cable.

BRIEF DESCRIPTION OF THE DRAWINGS

FIGS. 2A and 2B are views for illustrating a power cable according to the present invention, in which FIG. 2A is a cross-sectional view schematically showing the power cable, and FIG. 2B is a cross-sectional view taken along line A-A' in FIG. 2A;

FIGS. 3A, 3B, and 3C are views for illustrating a power cable having a connection structure formed by winding an insulating tape according to the present invention, in which FIG. 3A is a schematic cross-sectional view of the power cable including the connection structure, FIG. 3B is a cross-sectional view taken along line B-B' in FIG. 3A, and FIG. 3C is a cross-sectional view taken along line C-C' in FIG. 3A;

FIGS. 4A, 4B, 4C, 4D, and 4E are views for illustrating a method of forming an insulating layer on the outer surface of a connection portion of a power cable according to the present invention, in which FIG. 4A is a cross-sectional view showing a state in which two power cables are provided such that exposed end portions of their conductors are spaced apart and face each other, FIG. 4B is a cross-sectional view showing a state in which the exposed end portions of their conductors are conductively connected to each other, FIG. 4C is a cross-sectional view showing a state in which an inner semiconducting layer is formed on the outer circumference of the connection portion, FIG. 4D is a cross-sectional view showing a state in which an insulating layer is formed on the outer circumference of the inner semiconducting layer on the connection portion, and FIG. 4E is a cross-sectional view showing a state in which an outer semiconducting layer is formed on the outer circumference of the insulating layer;

PREFERRED MODE FOR CARRYING OUT THE INVENTION

Hereinafter, embodiments of the present invention will be described in detail. It will be understood that the embodiments below are not intended to limit the present invention and may be altered or modified in various ways without departing from the gist of the present invention.

Insulating Resin Composition

The insulating resin composition of the present invention includes at least a base resin including an unmodified polyolefin resin and a polyolefin resin modified with a polar group-containing molecule; and an antioxidant. The modified polyolefin resin is a polyolefin resin modified with at least one polar group-containing molecule selected from an unsaturated dicarboxylic acid, an unsaturated dicarboxylic acid anhydride, and an unsaturated dicarboxylic acid anhydride derivative. The base resin has what is called a sea-island structure including a first phase including an unmodified polyolefin resin; and a second phase provided in the first phase and including a modified polyolefin resin, in which the second phase has an average diameter of 2 μm or less.

The insulating resin composition according to an embodiment of the present invention has what is called a sea-island structure including: a first phase (sea phase) including an unmodified polyolefin resin; and a second phase (island phase) provided in the first phase and including a modified polyolefin resin and also has a very small second phase (island phase) size of 2 μm or less. These features reduce the biased distribution of polar groups and thus effectively reduce the amount of space charges accumulated in the resulting insulating layer, so that the insulating layer is less vulnerable to breakdown.

The insulating resin composition according to the embodiment includes at least a base resin (A) and an antioxidant (C). The insulating resin composition according to the embodiment preferably further includes a cross-linking agent (B).

Base Resin (A)

The base resin (A) includes a combination of a polyolefin resin (A1) modified with a polar group-containing molecule and an unmodified polyolefin resin (A2). Thus, the insulating resin composition includes both the modified polyolefin resin (A1), which is highly hydrophilic, and the unmodified polyolefin resin (A2), which is highly hydrophobic. This feature makes it possible to form what is called a sea-island structure including: a first phase including the unmodified polyolefin resin (A2); and a second phase provided in the first phase and including the modified polyolefin resin (A1).

Figure 1:
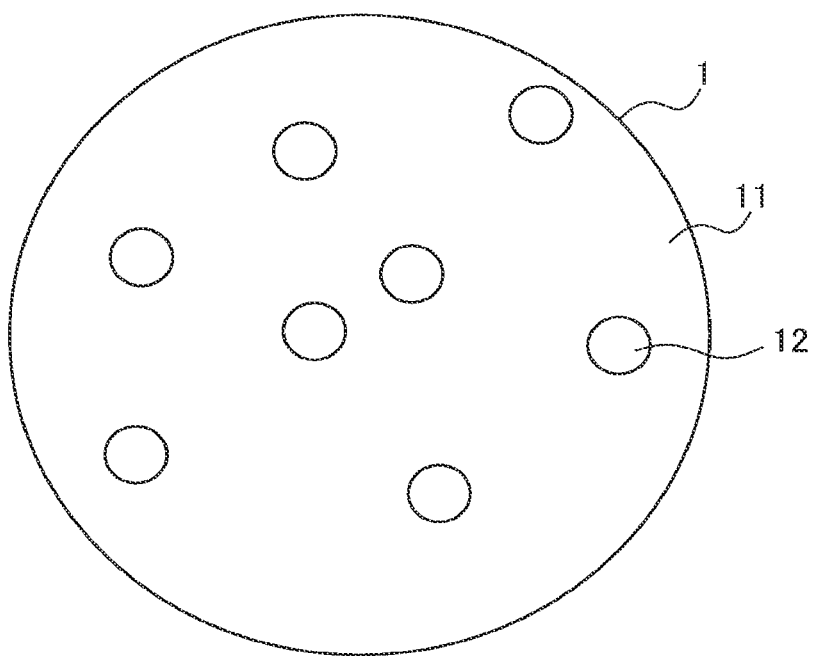
FIG. 1 is a schematic diagram for illustrating a sea-island structure possessed by an insulating resin composition according to the present invention.

The "sea-island structure" is, for example, a structure as shown in FIG. 1, which includes a first phase 11 called a sea phase; and a second phase 12 called an island phase. Thus, the insulating resin composition 1 according to the embodiment includes the first phase (sea phase) 11 including the unmodified polyolefin resin (A2); and the second phase (island phase) 12 provided in the first phase 11 (sea phase) and including the modified polyolefin resin (A1). Such a structure can reduce accumulation of space charges during current conduction through a power cable and thus can make an insulating layer made from the insulating resin composition 1 less vulnerable to breakdown.

In the sea-island structure, the second phase (island phase) 12 has an average diameter of 2 μm or less. This feature makes space charges less likely to accumulate in the island phase even during current conduction through a power cable and thus can prevent a reduction in the insulation performance of an insulating layer made from the insulating resin composition 1, which would otherwise be caused by local concentration of electric field.

The sea-island structure preferably includes 5 to 20 regions of the second phase (island phase) 12 with a diameter in the range of 0.5 μm to 2.0 μm within an observed area with a length of 10 μm and a width of 10 μm, and in the sea-island structure, all regions of the second phase (island phase) 12 preferably have a total area of 20 μm$^2$ or less. These features can further reduce the biased distribution of polar groups in the insulating resin composition and thus can make the insulating layer further less vulnerable to breakdown due to dispersion of accumulated space charges.

Confirmation of the presence of the sea-island structure in the insulating resin composition, measurement of the diameter of regions of the second phase (island phase) in the sea-island structure, and measurement of the number of regions of the second phase with a diameter in the range of 0.5 to 2 μm may be achieved by a process that includes optionally staining the resin composition with metal and then observing the resin composition or the cross-section thereof using, for example, a transmission electron microscope (TEM). The average diameter of the regions of the island phase was measured by a process including: setting the magnification of a transmission electron microscope to 10,000×; capturing an image of the sea-island structure; and determining the average diameter of the islands using the image with a contract adjusted to make the sea-island structure clear. In this case, the diameter of a region of the second phase (island phase) was defined as the arithmetic average of maximum and minimum sizes, in which the maximum and minimum sizes are the maximum and minimum of the sizes measured over the entire circumference (360 degrees) of the island phase region using image processing.

Modified Polyolefin Resin (A1)

The modified polyolefin resin (A1) in the base resin (A) is a polyolefin resin modified with a polar group-containing molecule. The modified polyolefin resin (A1) is contained in the second phase (island phase) of the sea-island structure.

The modified polyolefin resin (A1) is a polyolefin resin modified by bonding a polar group-containing molecule.

Preferred examples of the polyolefin resin include polyethylene resin, polypropylene resin, and copolymers of these resins. The modified polyolefin resin (A1) needs to be a polyolefin resin modified with at least one polar group-containing molecule selected from the group consisting of an unsaturated dicarboxylic acid, an unsaturated dicarboxylic acid anhydride, and an unsaturated dicarboxylic acid derivative.

Among the polar group-containing molecules, examples of the unsaturated dicarboxylic acid include maleic acid, fumaric acid, and itaconic acid. Examples of the unsaturated dicarboxylic acid anhydride include maleic anhydride and itaconic anhydride. Examples of the unsaturated dicarboxylic acid derivative include monomethyl esters, monoethyl esters, diethyl esters, amides, and imides of the unsaturated dicarboxylic acid. More specific examples include monomethyl maleate, monoethyl maleate, diethyl maleate, monomethyl fumarate, dimethyl fumarate, diethyl fumarate, maleic acid monoamide, maleimide, N-methylmaleimide, N-phenylmaleimide, and N-cyclohexylmaleimide. Among them, maleic anhydride is most preferably used, which has the highest carbonyl content per molecular weight and can impart hydrophilicity to the polyolefin resin when added only in a small mount. These polar group-containing molecules may be used alone, or two or more of these polar group-containing molecules may be used in combination.

The modified polyolefin resin (A1) may be obtained by modifying the polyolefin resin with the polar group-containing molecule or may be a commercially available resin. Preferred examples of such a commercially available resin include Himilan (ionomer resin, Mitsui DuPont Polychemical Co., Ltd.), Nucrel (ethylene-methacrylic acid copolymer, DuPont Corporation), SCONA TSPE (maleic anhydride-modified, low-density polyethylene, BYK Co., Ltd.), Orevac G (maleic anhydride-modified, low-density polyethylene, Arkema S. A.), Modic (maleic anhydride-modified, low-density polyethylene, Mitsubishi Chemical Co., Ltd.), Umex (maleic anhydride-modified polypropylene, Sanyo Chemical Industries Ltd.), REO-070-1 (maleic anhydride-modified polypropylene, Riken Vitamin Co., Ltd.), Kayabrid (maleic anhydride-modified polypropylene, Kayaku Akzo Corporation), SCONA TPPP (maleic anhydride-modified, low-density polyethylene, BYK Co., Ltd.), and Admer (maleic anhydride-modified polypropylene, Mitsui Chemical Co., Ltd.).

The modified polyolefin resin (A1) preferably has a melting point of 90° C. or more and 140° C. or less, more preferably 90° C. or more and 130° C. or less, even more preferably 100° C. or more and 120° C. or less as measured by differential scanning calorimetry according to JIS K 7121-1987.

Unmodified Polyolefin Resin (A2)

In the base resin (A), the unmodified polyolefin resin (A2) is contained in the first phase (sea phase) of the sea-island structure and acts as a dispersion medium for the modified polyolefin resin (A1).

The unmodified polyolefin resin (A2) may be a known resin and, in particular, preferably includes low-density polyethylene having a branched structure and a specific gravity of 0.900 or more and 0.940 or less, polypropylene, or a copolymer of linear low-density polyethylene and an alkene. The unmodified polyolefin resin (A2) provides high flexibility for an insulating tape or layer made from the insulating resin composition and thus can provide easy handleability for a power cable.

The unmodified polyolefin resin (A2) preferably has a melting point of 90° C. or more and 170° C. or less, more preferably 90° C. or more and 130° C. or less, even more preferably 100° C. or more and 120° C. or less as measured by differential scanning calorimetry according to JIS K 7121-1987.

Regarding the content ratio of the modified polyolefin resin (A1) to the unmodified polyolefin resin (A2) in the base resin (A), 1 part by mass of the modified polyolefin resin (A1) is preferably blended with 2 parts by mass or more and 20 parts by mass or less of the unmodified polyolefin resin (A2) in order to facilitate operations, such as kneading with additives, for obtaining a uniform resin composition and to adjust the hydrophilic group concentration to a suitable level.

Cross-Linking Agent (B)

The resin composition according to the present invention preferably contains a cross-linking agent (B) for cross-linking the base resin (A). The cross-linking agent (B) will cross-link the base resin (A) to increase the mechanical properties and heat resistance of the resin material. When an insulating layer is formed using an insulating tape including the insulating resin composition, the cross-linking agent (B) also acts to bond adjacent portions of the insulating tape.

The cross-linking agent (B) preferably includes an organic peroxide that undergoes thermal decomposition to generate radicals when heated.

Examples of the cross-linking agent (B) include dicumyl peroxide (DCP), benzoyl peroxide, dichlorobenzoyl peroxide, di-tert-butyl peroxide, butyl peracetate, tert-butyl perbenzoate, and 2,5-dimethyl-2,5-di(tert-butylperoxy)hexane. Among them, the cross-linking agent (B) preferably includes DCP. The cross-linking agent (B) may include one of these compounds or a combination of two or more of these compounds.

The content of the cross-linking agent (B) preferably has a lower limit of 0.1 parts by mass or more, more preferably 0.5 parts by mass or more based on 100 parts by mass of the total amount of the base resin (A). According to this feature, mechanical properties and heat resistance of the resin material can be increased by cross-linking of the polyolefin resin. On the other hand, the content of the cross-linking agent (B) preferably has an upper limit of 5 parts by mass, more preferably 3 parts by mass, based on 100 parts by mass of the total amount of the base resin (A). This feature makes it possible to prevent abnormal cross-linking-induced degradation of electric properties during extrusion of the insulating resin composition.

Antioxidant (C)

The antioxidant (C), which is also called an age resister, acts to prevent the degradation of the insulating resin composition or the insulating tape or layer including the insulating resin composition, which is caused by heat or oxygen in the air.

Examples of the antioxidant (C) include antioxidants belonging to one or more of phenolic antioxidants, phosphorus antioxidants, sulfur antioxidants, amine antioxidants, hydrazine antioxidants, and amide antioxidants, and derivatives thereof. In particular, two or more of these compounds may be used in combination as the antioxidant (C). The antioxidant (C) preferably includes a phenolic antioxidant or an amine antioxidant and a phosphoric acid antioxidant or a sulfur antioxidant.

Examples of the phenolic antioxidant include Irganox 245, Irganox 259, Irganox 565, Irganox 1010, Irganox 1035, Irganox 1076, Irganox 1098, Irganox 1222, Irganox 1330, Irganox 1425, Irganox 3114, Irganox 1520, Irganox 1135, and Irganox 1141 (all manufactured by BASF); Sumilizer BHT, Sumilizer MDP-S, Sumilizer GA-80, Sumilizer BBM-S, Sumilizer WX-R, and Sumilizer GM (all manufactured by Sumitomo Chemical Co., Ltd.); and Adekastab AO-20, Adekastab AO-30, Adekastab AO-40, Adekastab AO-50, Adekastab AO-80, and Adekastab AO-330 (all manufactured by ADEKA Corporation).

Examples of the phosphorus antioxidant include Irgafos 168, Irgafos P-EPQ, and Irgafos 126 (all manufactured by BASF); Sumilizer BBM-S (manufactured by Sumitomo Chemical Co., Ltd.); and Adekastab PEP-4C, Adekastab PEP-8, Adekastab PEP-36, Adekastab HP-10, Adekastab 1178, Adekastab 2112, Adekastab C, Adekastab 135A, and Adekastab 3010 (all manufactured by ADEKA Corporation).

Examples of the sulfur antioxidant include Ilganox PS800FL and Ilganox PS802FL (manufactured by BASF); Sumilizer WX (manufactured by Sumitomo Chemical Co., Ltd.); and Adekastab AO-503 and Adekastab AO-23 (manufactured by ADEKA Corporation).

The total content of the antioxidant (C) preferably has a lower limit of 0.01 parts by mass or more, more preferably 0.2 parts by mass based on 100 parts by mass of the total amount of the base resin (A). This feature makes it possible to reduce the generation of scorch during the kneading for the insulating resin composition and to provide high heat aging resistance for the insulating layer, which is obtained by cross-linking the insulating resin composition. On the other hand, the total content of the antioxidant (C) preferably has an upper limit of 0.8 parts by mass, more preferably 0.6 parts by mass based on 100 parts by mass of the total amount of the base resin (A). This feature makes it possible to reduce the content of water produced during the cross-linking of the resin and to reduce bleeding from the cross-liked resin.

Moreover, the total content of the antioxidant (C) is preferably 5 to 50 parts by mass based on 100 parts by mass of the cross-linking agent (B).

Other Components (D)

The insulating resin composition according to the embodiment may contain other components as needed. For example, the insulating resin composition may contain any of various additives, such as a moisture absorber, a heat stabilizer, a light stabilizer, a flame retardant, a softener, a filler, a colorant, a solvent, a pigment, a dye, and a phosphor.

Properties of Insulating Resin Composition

The insulating resin composition according to the embodiment preferably has a low level of electric field multiplication factor(=measured maximum electric field/applied electric field), which represents the degree of accumulation of space charges and may be obtained through measuring space charges by pulsed electrostatic stress method. The resin composition with such a feature can form an insulating layer in which space charges will be accumulated in only a small amount and thus can form an insulating layer less vulnerable to breakdown. In the embodiment, the insulating resin composition preferably has an electric field multiplication factor of 130% or less. In particular, the resin composition with an electric field multiplication factor of less than 110% is suitable as an insulating material for DC power cables.

Methods of Producing Insulating Resin Composition

Methods of producing the insulating resin composition according to the embodiment may be mainly classified into two methods. A first method of producing the insulating resin composition includes adding an unmodified polyolefin resin and an antioxidant and optionally a cross-linking agent to a polyolefin resin modified with at least one polar group-containing molecule selected from an unsaturated dicarboxylic acid, an unsaturated dicarboxylic acid anhydride, and an unsaturated dicarboxylic acid anhydride derivative to obtain a base resin including a dilution of the modified polyolefin resin with the unmodified polyolefin resin. This method includes kneading the unmodified polyolefin resin, the antioxidant, and the modified polyolefin resin and optionally the cross-linking agent such that the base resin has what is called a sea-island structure including: a first phase including the unmodified polyolefin resin; and a second phase provided in the first phase and including the modified polyolefin resin and the second phase has an average diameter of 2 µm or less (method (I)). A second method of producing the insulating resin composition includes adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated dicarboxylic acid anhydride derivative to prepare diluted polyolefin pellets including a base resin including a dilution of the modified polyolefin resin with the unmodified polyolefin resin; then optionally adding a cross-linking agent to the diluted polyolefin pellets. This method includes dry blending the cross-linking agent and the diluted polyolefin pellets such that the base resin has what is called a sea-island structure including: a first phase including the unmodified polyolefin resin; and a second phase provided in the first phase and including the modified polyolefin resin and the second phase has an average diameter of 2 µm or less (method (II)).

Method (I) of Producing Insulating Resin Composition

The first method (I) of producing the insulating resin composition includes adding an unmodified polyolefin resin and an antioxidant and optionally a cross-linking agent to a polyolefin resin modified with at least one polar group-containing molecule selected from an unsaturated dicarboxylic acid, an unsaturated dicarboxylic acid anhydride, and an unsaturated dicarboxylic acid anhydride derivative; and kneading the unmodified polyolefin resin, the antioxidant, and the modified polyolefin resin, and optionally the cross-linking agent to obtain a base resin including a dilution of the modified polyolefin resin with the unmodified polyolefin resin. This method includes performing kneading such that the base resin has what is called a sea-island structure including: a first phase including the unmodified polyolefin resin; and a second phase provided in the first phase and including the modified polyolefin resin and the second phase has an average diameter of 2 µm or less.

Raw Material Preparation and Production

The base resin (A), the cross-linking agent (B), and the antioxidant (C) for use as raw materials in the method of producing the insulating resin composition according to the present embodiment may be those described above. The modified polyolefin resin (A1) used to form the base resin (A) is a polyolefin resin modified with at least one polar group-containing molecule selected from an unsaturated dicarboxylic acid, an unsaturated dicarboxylic acid anhydride, and an unsaturated dicarboxylic acid anhydride derivative.

The modification of the polyolefin resin with the polar group-containing molecule may be performed, for example, by melting and kneading the unmodified polyolefin resin and the polar group-containing molecule together with a small amount of a cross-linking agent for addition reaction in a single- or twin-screw extruder. In this step, the antioxidant is preferably added together with the polar group-containing molecule in order to prevent abnormal cross-linking of the polyolefin resin.

Kneading Step

In the kneading step of the method (I) of producing the insulating resin composition, the unmodified polyolefin resin (A2) and the antioxidant (C) may be added to and kneaded with the modified polyolefin resin (A1), in which these materials are raw materials for the insulating resin composition. In this step, the cross-linking agent (B) may also be added together with the unmodified polyolefin resin (A2) and the antioxidant (C) and subjected to kneading. As a result, the modified polyolefin resin (A1) is diluted with the unmodified polyolefin resin (A2) to form a base resin (A) with a polar group concentration adjusted in a desired range. Moreover, as the modified polyolefin resin (A1) and the unmodified polyolefin resin (A2) are kneaded in the base resin (A), what is called a sea-island structure is formed including: a first phase (sea phase) including the unmodified polyolefin resin (A2); and a second phase (island phase) provided in the first phase and including the modified polyolefin resin (A1), and the average diameter of the second phase (island phase) is reduced.

In the kneading, a premix of raw materials including the base resin (A) and the antioxidant (C) and optionally the cross-linking agent (B) may be kneaded. In particular, however, when the cross-linking agent (B) is added, the cross-linking agent (B) may be thermally decomposed by heat during the kneading so that the base resin (A) may undergo abnormal cross-linking. To prevent such abnormal cross-linking, raw materials including the base resin (A) and the antioxidant (C) are preferably kneaded first, and then the cross-linking agent (B) is preferably added to and kneaded with the mixture.

The raw materials for the insulating resin composition may be melted and kneaded in a single- or twin-screw extruder. In particular, a single-screw extruder is more preferably used for melting and kneading in order to prevent the resin from scorching due to excessive shear heating.

Figure 5:
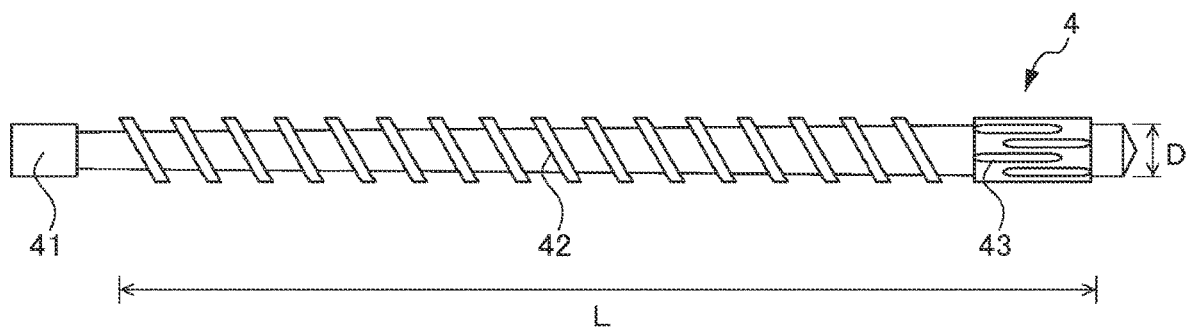
FIG. 5 is a front view showing an example of a screw (shown in Examples) that is suitable for use in extrusion in a method of producing an insulating resin composition according to the present invention and includes a full-flight screw with a resin mixing portion provided at a distal end portion of the screw.
Figure 6:
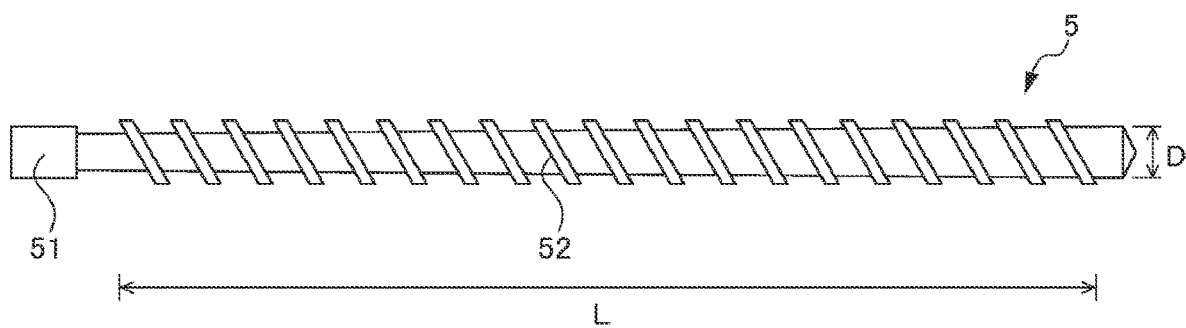
FIG. 6 is a front view showing an example of a screw that is for use in extrusion in a method of producing an insulating resin composition and includes a common full-flight screw.

In this regard, the screw of a single-screw extruder is preferably, for example, a screw 4 as shown in FIG. 5, which includes a full flight screw 42; and a resin mixing portion 43, such as a Maddock type or Dulmadge type, provided at an intermediate or distal end portion of the screw 42. In this regard, for example, when a screw 5 as shown in FIG. 6 including a common full flight screw 52 is used, raw materials including at least the base resin (A) and the antioxidant (C) placed in the extruder may be only pushed at a constant rate forward to the distal end of the screw and cannot be expected to be fully kneaded. In contrast, in the embodiment, when the screw 4 having the resin mixing portion 43 such as Maddock type or Dulmadge type as shown in FIG. 5 is used, a strong shear force can be applied to the raw materials in the extruder until they are pushed to the distal end of the screw, and the kneading time during the extrusion can also be prolonged, so that the raw materials can be fully kneaded.

During the modification of the polyolefin resin, the melting and kneading is preferably performed at a temperature of 140° C. or more, more preferably 160° C. or more in order to allow the polyolefin resin to melt and have a viscosity for moderate stirring in the cylinder. On the other hand, the melting and kneading temperature preferably has an upper limit of 300° C. or less in order to prevent abnormal crosslinking-induced scorching. In particular, the upper limit of the melting and kneading temperature is preferably 280° C. or less in order to rapidly complete uniform reaction.

The method for mixing at the resin mixing portion 54 of the screw 4 may be a position exchange method including providing a complicated flow field to facilitate the exchange of the positions of raw materials and thus to facilitate distribution and mixing, in which, for example, a Dulmadge type, DIS type, or pin type screw may be used to form the resin mixing portion 43. A barrier-slit method may also be used in which shear stress is allowed to act strongly to facilitate the dispersion and mixing of the raw materials, in which, for example, a ring type, Maddock type, Unimelt type, or double flight type screw may be used to form the resin mixing portion 43. An elongation deformation method may also be used in which elongation flow is utilized to facilitate the dispersion and mixing of the raw materials, in which, for example, a wave type, CTM type, barrel pin type, HM type, or Spirex type screw may be used to form the resin mixing portion 43.

In general, the size of the working portion of the screw 4 for kneading is represented by the ratio of length L to diameter D (L/D ratio). The L/D ratio is preferably 18 or more. The L/D ratio preferably has an upper limit of less than 40.

The kneading temperature in the kneading step is preferably higher than the melting point of at least one of the base resins (A) in order to obtain a uniform kneaded paste. In particular, when the cross-linking agent (B) is also subjected to kneading, the kneading temperature in the kneading step is preferably 130° C. or less in order to keep the base resin (A) from abnormal cross-linking due to thermal decomposition of the cross-linking agent (B). On the other hand, when the cross-linking agent (B) is not added, the kneading temperature may exceed 130° C. in the kneading step.

Method (II) of Producing Insulating Resin Composition

The second method (II) of producing the insulating resin composition includes adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated dicarboxylic acid anhydride derivative to prepare diluted polyolefin pellets including a base resin including a dilution of the modified polyolefin resin with the unmodified polyolefin resin; then adding a cross-linking agent to the diluted polyolefin pellets. This method includes dry blending the cross-linking agent and the diluted polyolefin pellets such that the base resin has what is called a sea-island structure including: a first phase including the unmodified polyolefin resin; and a second phase provided in the first phase and including the modified polyolefin resin and the second phase has an average diameter of 2 µm or less. Specifically, the method (II) of producing the insulating resin composition differs from the method (I) of producing the insulating resin composition in that the method (I) includes adding the antioxidant (C) and the cross-linking agent (B) to the base resin (A) and kneading them, whereas the method (II) includes, instead of the kneading, adding the antioxidant (C) to the base resin (A) to prepare diluted polyolefin pellets and then dry blending the diluted polyolefin pellets with the cross-linking agent (B).

Dry Blending Step

The dry blending step follows pelletizing an antioxidant (C)-containing dilution of the modified polyolefin resin (A1) with the unmodified polyolefin resin (A2) and includes heating the pellets and the cross-linking agent (B) to melt the cross-linking (B) and to allow the pellets to absorb the cross-linking (B). In the dry blending step, the cross-linking (B) is preferably heated to a temperature equal to or higher than the melting point of the cross-linking (B) and more preferably heated to a temperature at least 10° C. higher than the melting point of the cross-linking (B), so that the absorption of the melted cross-linking (B) into the pellets can be facilitated. On the other hand, the heating temperature during the dry blending is preferably not higher than the decomposition temperature of the cross-linking (B) so that abnormal cross-linking of the base resin (A) can be prevented.

For example, when dicumyl peroxide (DCP) is used as the cross-linking agent (B), the heating temperature during the dry blending is preferably not lower than 40° C., which is the melting point of DCP, and more preferably not lower than 50° C. so that the melted DPC can be rapidly absorbed into the pellets. On the other hand, the dry blending is preferably performed at a temperature not higher than 130° C., which is the decomposition temperature of DCP, in order to prevent the decomposition of DCP.

Insulating Tape for Use in Covering Connection Portion of Power Cable

The insulating tape according to an embodiment of the present invention is made from the insulating resin composition as a raw material and for use in covering a connection portion of a power cable. More specifically, the insulating tape is used in such a manner that it is wound around the outer circumference of a connection portion including exposed end portions of conductively connected conductors of multiple power cables, on which an inner semiconducting layer is optionally stacked, so that an insulating layer is formed to cover the connection portion.

The insulating tape according to the embodiment preferably has a thickness of 30 µm or more, more preferably 50 µm or more, even more preferably 70 µm or more in order to reduce the number of winds around the connection portion. On the other hand, the thickness of the insulating tape preferably has an upper limit of 250 µm or less, more preferably 200 µm or less, even more preferably 150 µm or less, in order to facilitate winding around the connection portion.

The insulating tape according to the embodiment preferably has a width of 3 mm or more and 40 mm or less in order to form a smooth wound surface.

The insulating tape according to the embodiment is preferably used to form an insulating layer in such a manner that it is wound around the outer circumference of the connection portion including exposed end portions of conductively connected conductors of multiple power cables. In particular, an insulating layer having the desired sea-island structure can be formed to cover the outer circumference of the connection portion if the tape is prevented from stretching during the winding of the tape and the resin is prevented from melt flowing during the cross-linking of the base resin (A).

Method of Producing Insulating Tape

The method of producing the insulating tape according to the embodiment is not restricted and may include, for example, extruding the insulating resin composition into a film; cooling the surface of the film to a temperature equal to or lower than the melting point of the unmodified polyolefin resin within 15 seconds after the extrusion of the insulating resin composition; and subjecting the film to slitting to form tapes.

The insulating resin composition may be extruded into a film with a desired thickness using an inflation method, a T die method, a casting method, a calendering method, or other methods, among which an inflation method is preferred.

When the base resin (A) includes a polyethylene resin, the extrusion die preferably has a temperature of 120° C. or more during the extrusion of the insulating resin composition into a film. This makes it possible to form a tape containing a sea-island structure with a small second phase (island phase) average diameter. On the other hand, when the cross-linking agent (B) is added, the die temperature preferably has an upper limit of 150° C. or less, more preferably 140° C. or less in order to reduce the degradation of the cross-linking (B) in the insulating resin composition.

The surface of the film formed is cooled to a temperature equal to or lower than the melting point of the unmodified polyolefin resin (A2) within 15 seconds, more preferably within 10 seconds after the extrusion of the insulating resin composition. This step suppresses the growth of the second phase (island phase) in the insulating tape formed. Thus, the resulting insulating tape still has the desired sea-island structure even when wound around a connection portion of a power cable, and thus can form an insulating layer less vulnerable to breakdown.

Methods for cooling the film include a method of adjusting the temperature of and the distance to the roll with which the film first comes into contact; a method of air-cooling the surface of the film; a method of lowering the working environment temperature; and a method of bringing a heat-sink plate into contact with the film. In particular, when the film is formed by an inflation method, a method of adjusting, to a low level, the temperature of the air used to inflate the film is preferred because it allows accurate adjustment of the temperature.

The film made from the insulating resin composition is subjected to slitting at least before or after the film is cooled, so that tapes with a desired width are formed.

Power Cable (First Embodiment)

Figure 2A:
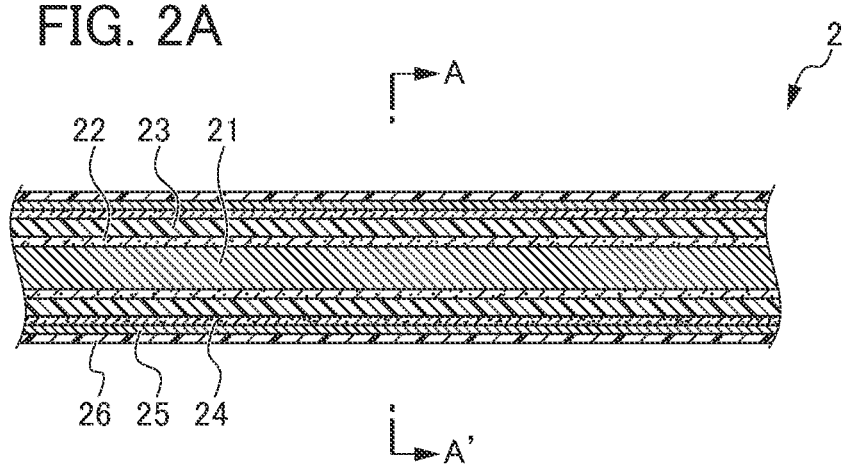
Figure 2B:
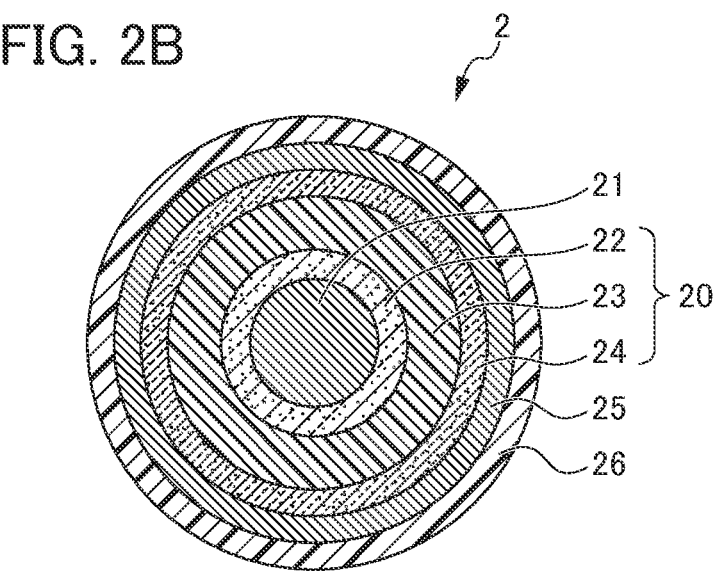

As shown in FIGS. 2A and 2B, a power cable 2 according to an embodiment of the present invention includes a conductor 21; and a composite coating 20 on the outer circumference of the conductor 21, in which the composite coating 20 includes an inner semiconducting layer 22 including a first electrically-conductive resin; an insulating layer 23 made from the insulating resin composition as a raw material and including a cross-linking reaction product of at least the modified polyolefin resin (A2) in the second phase (island phase) and a cross-linking reaction product of at least the unmodified polyolefin resin (A1) in the first phase (sea phase); and an outer semiconducting layer 24 including a second electrically-conductive resin, and the inner semiconducting layer 22, the insulating layer 23, and the outer semiconducting layer 24 are stacked in order on the conductor 21.

As shown in FIG. 2B, the power cable 2 includes the inner semiconducting layer 22, the insulating layer 23, and the outer semiconducting layer 24, which are stacked in order on the outer circumference of the conductor 21. The inner semiconducting layer 22, the insulating layer 23, and the outer semiconducting layer 24 form the composite coating 20. A metal shielding layer 25 and a sheath 26 are preferably stacked in order on the composite coating 20.

Insulating Layer

The insulating layer 23 is preferably formed by winding an insulating layer-forming insulating tape with a thickness in the range of 30 μm or more and 250 μm or less and a width in the range of 3 mm or more and 40 mm or less around the outer circumference of the inner semiconducting layer 22 and cross-linking the tape. The insulating layer 23 is made from the insulating resin composition as a raw material and includes a cross-linking reaction product of at least the modified polyolefin resin (A2) in the second phase (island phase) and a cross-linking reaction product of at least the unmodified polyolefin resin (A1) in the first phase (sea phase) of the sea-island structure.

For insulating properties, the insulating layer 23 preferably has a thickness of 1.5 mm or more, more preferably 5 mm or more, even more preferably 15 mm or more. On the other hand, for laying operation, the thickness of the insulating layer 23 preferably has an upper limit of 100 mm or less, more preferably 50 mm or less.

Inner Semiconducting Layer and Outer Semiconducting Layer

The inner semiconducting layer 22 and the outer semiconducting layer 24 are made from a semiconducting resin composition as a raw material, which includes, for example, a cross-linkable resin and electrically-conductive carbon black, and optionally a cross-linking agent. The inner semiconducting layer 22 and the outer semiconducting layer 24 respectively include a first electrically-conductive resin and a second electrically-conductive resin, in which at least the cross-linkable resin is cross-linked. The cross-linkable resin may be one or more resins selected from, for example, an ethylene-vinyl acetate copolymer, an ethylene-methyl acrylate copolymer, an ethylene-ethyl acrylate copolymer, and an ethylene-butyl acrylate copolymer.

The inner semiconducting layer 22 and the outer semiconducting layer 24 each preferably have a thickness of 0.1 mm or more, more preferably 0.5 mm or more, in order that the electric filed bias is reduced based on their conducting properties. The thickness of the inner semiconducting layer 22 and the thickness of the outer semiconducting layer 24 each preferably have an upper limit of 3 mm or less, more preferably 2 mm or less, even more preferably 1 mm or less, in order to rapidly dissipate heat generated during power transmission through the power cable.

The inner semiconducting layer 22 and the outer semiconducting layer 24 preferably have a total thickness of 5 mm or less, more preferably 4 mm or less, even more preferably 3 mm or less. This feature can facilitate the cooling of the insulating resin composition and thus suppress the growth of the second phase (island phase) in the sea-island structure, even when a semiconducting resin composition as a raw material for the inner semiconducting layer 22, the insulating resin composition as a raw material for the insulating layer 23, and a semiconducting resin composition as a raw material for the outer semiconducting layer 24 are stacked on the conductor 21 and then the insulating resin composition is cross-linked. On the other hand, if the total thickness is large, the insulating resin composition may slowly cool so that the second phase (island phase) may easily grow in the sea-island structure.

Metal Shielding Layer and Anticorrosive Sheath

A metal shielding layer and an anticorrosive sheath (both not shown) may be provided around the outer semiconducting layer 24. The metal shielding layer may be made of, for example, lead, copper, or aluminum. The anticorrosive sheath may be made of, for example, polyvinyl chloride, polyethylene, or nylon.

Method of Producing Power Cable

The method of producing the power cable according to the embodiment may be a method of producing the power cable 2 shown in FIGS. 2A and 2B, including: stacking the inner semiconducting layer 22, the insulating layer 23, and the outer semiconducting layer 24 in order on the outer circumference of the conductor 21; and cross-linking at least the insulating layer 23.

Stacking Inner Semiconducting Layer, Insulating Layer, and Outer Semiconducting Layer The inner semiconducting layer 22 may be formed by extruding, onto the outer circumference of the conductor 21, a semiconducting resin composition including, for example, a cross-linkable resin and electrically-conductive carbon black, and optionally a cross-linking agent. The insulating layer 23 may be formed by extruding the insulating resin composition onto the outer circumference of the semiconducting resin composition as the raw material for the inner semiconducting layer 22. The outer semiconducting layer 24 may be formed by extruding a semiconducting resin composition, which is similar to that for the inner semiconducting layer 22, onto the outer circumference of the insulating resin composition as the raw material for the insulating layer

23. The inner semiconducting layer 22, the insulating layer 23, and the outer semiconducting layer 24 may be simultaneously formed by co-extrusion onto the outer circumference of the conductor 21.

When the base resin (A) includes a polyethylene resin, the resin is preferably extruded at a temperature of 110° C. or more, more preferably 120° C. or more. In order to suppress the cross-linking reaction of the base resin (A), the resin is preferably extruded at a temperature of 140° C. or less, more preferably 130° C. or less.

In this method, the deposited insulating layer 23 is cooled to a temperature equal to or lower than the melting point of the unmodified polyolefin resin (A2) within 15 seconds, more preferably within 10 seconds after the extrusion on the outer circumference of the conductor 21 and the inner semiconducting layer 22. This step suppresses the growth of the second phase (island phase) in the sea-island structure provided in the insulating resin composition. Thus, the resulting insulating layer 23 is less vulnerable to breakdown. The insulating layer 23 may be cooled by such a method as air-cooling the resin surface, lowering the working environment temperature, or bring a heatsink plate into contact with the insulating layer 23.

Cross-Linking Insulating Layer

When the semiconducting resin composition contains the cross-linking agent (B), the deposited insulating layer 23 is subjected to a cross-linking step that includes pressure heating the insulating layer 23 under conditions at 300 kPa or more and 5,000 kPa or less and at 140° C. or more and 280° C. or less to cross-link the modified polyolefin resin (A1) and the unmodified polyolefin resin (A2) in the insulating layer 23. This step increases the mechanical properties and heat resistance of the insulating layer 23.

The cross-linking step may include pressure heating in a closed pressure vessel charged with pressurized gas. In the cross-linking step, the pressure heating is preferably performed at a pressure of 300 kPa or more, more preferably 400 kPa or more. In order to prevent the breaking of the seal of the closed portion of the pressure vessel, the pressure heating in the cross-linking step is preferably performed at a pressure of 5,000 kPa or less, more preferably 1,000 kPa or less.

The heating temperature in the cross-linking step is preferably 140° C. or more, more preferably 160° C. or more in order to facilitate the cross-linking reaction mediated by the cross-linking agent. In the cross-linking step, the heating temperature is preferably 280° C. or less, more preferably 260° C. or less in order to prevent the thermal decomposition of the polyolefin resin.

Power Cable (Second Embodiment)

Figure 3A:
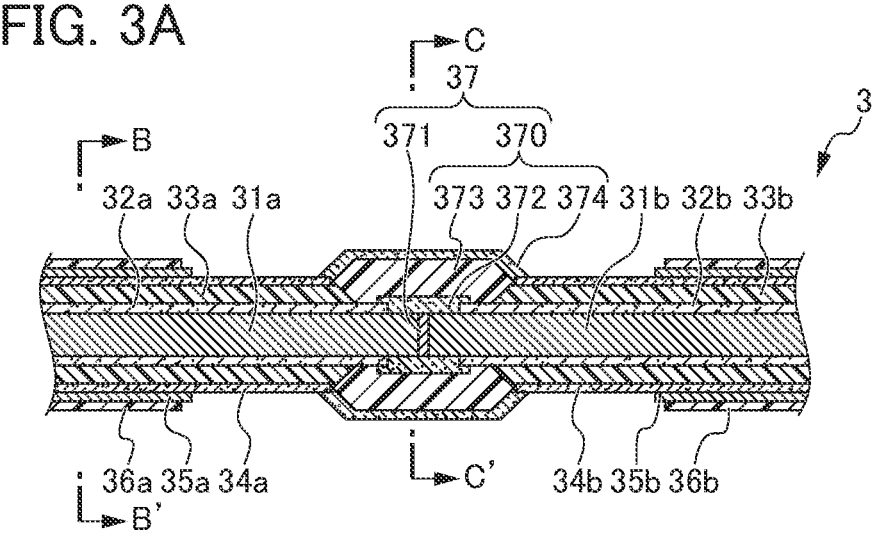
Figure 3B:
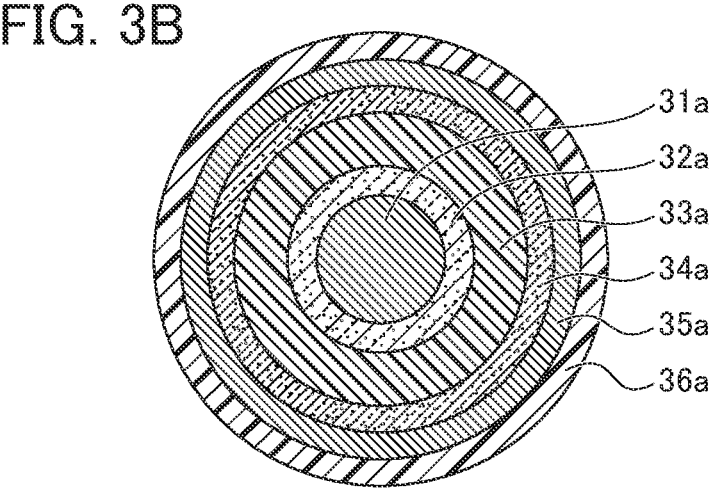
Figure 3C:
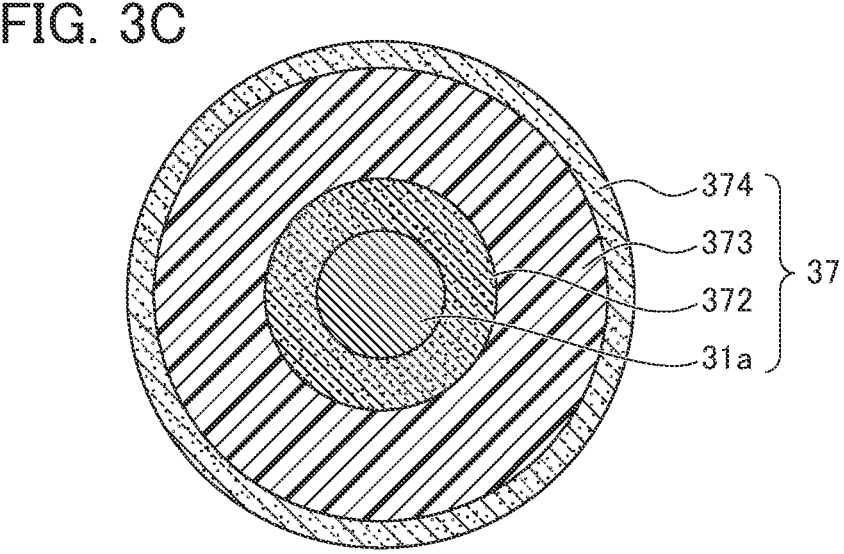

As shown in FIG. 3A, a power cable 3 according to an embodiment of the present invention includes a connection structure 37. As shown in FIGS. 3A, 3B, and 3C, the connection structure 37 includes a connection portion 371 including exposed end portions of conductors (two conductors 31a and 32a in this case) of multiple power cables, in which the exposed end portions are conductively connected together; and a composite coating 370 that is on the outer circumference of the connection portion 371 and includes an inner semiconducting layer 372 including a first electrically-conductive resin; an insulating layer 373 made from the insulating resin composition as a raw material and including a cross-linking reaction product of at least the modified polyolefin resin (A1) in the second phase (island phase) and a cross-linking reaction product of at least the unmodified polyolefin resin (A2) in the first phase (sea phase); and an outer semiconducting layer 374 including a second electrically-conductive resin, in which the inner semiconducting layer 372, the insulating layer 373, and the outer semiconducting layer 374 are stacked in order on the outer circumference of the connection portion 371.

In the power cable 3, as shown in FIGS. 3A and 3C, the inner semiconducting layer 372, the insulating layer 373, and the outer semiconducting 374 are stacked in order on the outer circumference of the connection portion 371 to form the connection structure 17.

Insulating Layer

For insulating properties, the insulating layer 373, which covers the outer circumference of the connection portion 371, preferably has a thickness of 1.5 mm or more, more preferably 5 mm or more, even more preferably 15 mm or more. For laying operation, the thickness of the insulating layer 373 preferably has an upper limit of 100 mm or less, more preferably 50 mm or less.

The insulating layer 373 may be formed by winding the insulating layer-forming insulating tape around the outer circumference of the inner semiconducting layer 372 and cross-linking the insulating tape. In the embodiment, the insulating layer 373 having the desired sea-island structure is easily formed using the insulating layer-forming insulating tape, and the resulting insulating layer 373 is less vulnerable to breakdown. As mentioned above, the insulating layer-forming insulating tape used to form the insulating layer 373 preferably has a thickness in the range of 30 μm or more and 250 μm or less and a width in the range of 3 mm or more and 40 mm or less.

Inner Semiconducting Layer and Outer Semiconducting Layer

The inner semiconducting layer 372 and the outer semiconducting layer 374, which cover the outer circumference of the connection portion 371, may be the same as those in the first embodiment. The inner semiconducting layer 372 and the outer semiconducting layer 374 each preferably has a thickness of 0.1 mm or more, more preferably 0.5 mm or more in order that the electric field bias is reduced based on their conducting properties. The thickness of the inner semiconducting layer 372 and the thickness of the outer semiconducting layer 374 each preferably has an upper limit of 3 mm or less, more preferably 2 mm or less, even more preferably 1 mm or less in order to rapidly dissipate heat generated during power transmission through the power cable.

The inner semiconducting layer 372 and the outer semiconducting layer 374 preferably have a total thickness of 5 mm or less, more preferably 4 mm or less, even more preferably 3 mm or less similar to those in the first embodiment.

Metal Shielding Layer and Anticorrosive Sheath

A metal shielding layer and an anticorrosive sheath (both not shown) may be provided around the outer semiconducting layer 374 as in the power cable according to the first embodiment.

Method of Forming an Insulating layer on the Outer Surface of a Connection Portion of a Power Cable A method of forming an insulating layer on the outer surface of a connection portion of a power cable according to an embodiment of the present invention includes a tape winding step that includes winding the insulating tape around the outer circumference of a connection portion including exposed end portions of conductively connected conductors of multiple power cables so that an insulating layer is formed on the outer surface of the connection portion; and a cross-linking step that includes pressure heating the insulating layer-covered connection portion under conditions at 300 kPa or more and 5,000 kPa or less and at 140° C. or more and 280° C. or less to cross-link the unmodified polyolefin resin and the modified polyolefin resin in the insulating layer.

FIGS. 4A to 4E are views for illustrating a method of forming the insulating layer according to the present invention. FIGS. 4A to 4E shows an example of connecting a power cable 30a and a power cable 30b, in which the power cable 30b includes a conductor 31a including copper, aluminum, or the like; and an inner semiconducting layer 32a, an insulating layer 33a, an outer semiconducting layer 34a, a metal shielding layer 35a, and a sheath 36a stacked in order on the circumference of the conductor 31a, and the power cable 30b includes a conductor 31b; and an inner semiconducting layer 32b, an insulating layer 33b, an outer semiconducting layer 34b, a metal shielding layer 35b, and a sheath 36b stacked in order on the circumference of the conductor 31b.

Formation of Connection Portion

Figure 4A:
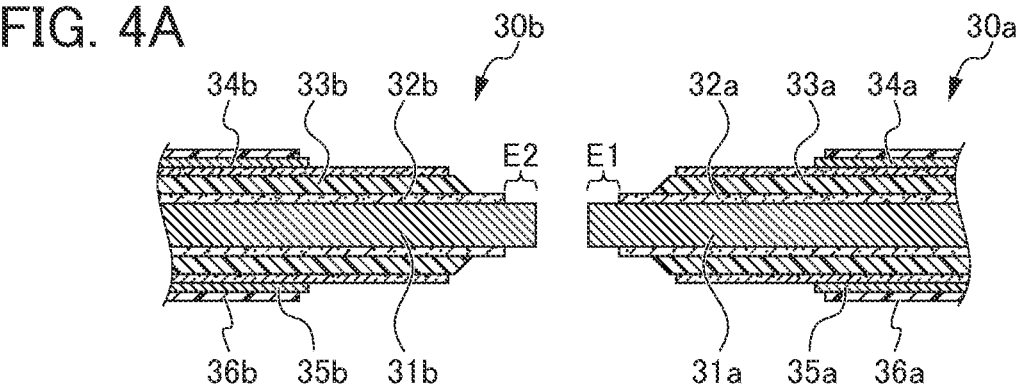

As shown in FIG. 4A, conductors 31a and 31b are exposed at end portions of multiple power cables 30a and 30b to be connected. The exposed portions have a length represented by E1 and a length represented by E2. When the insulating layers 33a and 33b include a highly hydrophilic resin, specifically, the modified polyolefin resin (A1), the insulating layers 33a and 33b are preferably exposed together with the conductors 31a and 31b. The insulating tape can be wound and laminated on the exposed portions of the insulating layer 33a and 33b with high adhesion between the insulating tape and the insulating layers 33a and 33b, which makes the interface between them less vulnerable to breakdown.

Figure 4B:
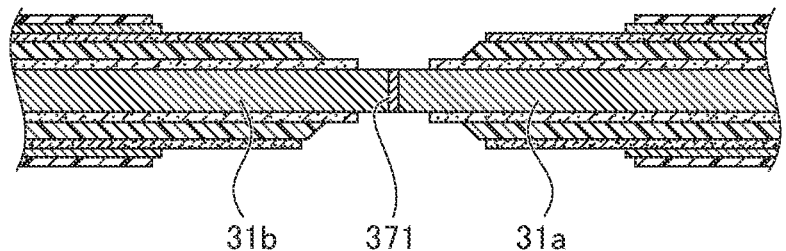

Subsequently, as shown in FIG. 4B, the end portions of the conductors 31a and 31b are conductively connected (joined) to each other. The conductors may be conductively connected by such a method as welding to form a connection portion 371 (welded portion).

Formation of Inner Semiconducting Layer

Figure 4C:
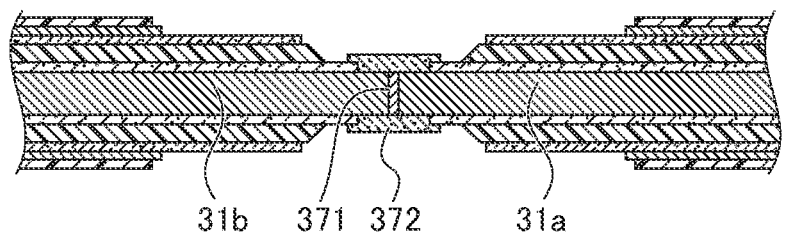

As shown in FIG. 4C, an inner semiconducting layer 372 may be formed around the outer circumference of the connection portion 371 formed. The inner semiconducting layer 372 is formed, for example, using a semiconducting resin composition including a cross-linkable resin and electrically-conductive carbon black, and optionally a cross-linking agent.

The inner semiconducting layer 372 may be obtained, for example, by molding a resin, and more specifically, it may be formed by extruding a resin onto the surface of the conductors 31a and 31b, formed by injecting a resin into a mold in which the conductors 31a and 31b are inserted, or formed by molding a resin into a tape and winding the tape around the surface of the conductors 31a and 31b. Alternatively, before the connection portion 371 is formed, one of the conductors 31a and 31b may be inserted in advance in a semiconducting, heat-shrinkable tube, and the tube may be shrunk by heating to form the inner semiconducting layer 372 after the connection portion 371 is formed.

Formation of Insulating Layer

Figure 4D:
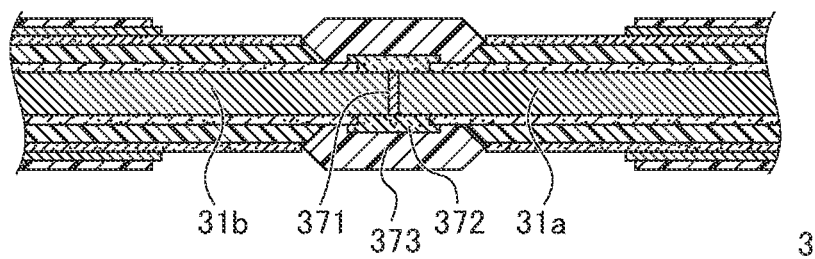

Subsequently, as shown in FIG. 4D, an insulating layer 373 is formed over the entire circumference of the connection portion 371 and the inner semiconducting layer 372, in which the connection portion 371 includes exposed end portions of conductively connected conductors 31a and 31b of the power cables 30a and 30b, and the inner semiconducting layer 372 is provided on the outer circumference of the connected portion 371.

The insulating layer 373 is preferably formed by a simple method, which preferably includes winding the insulating tape around the surfaces of the conductors 31a and 31b, in which the insulating tape includes the insulating resin composition as a raw material and has a thickness in the range of 30 µm or more and 250 µm or less and a width in the range of 3 mm or more and 40 mm or less. Alternatively, the insulating layer 373 may be formed by extruding the insulating resin composition onto the surfaces of the conductors 31a and 31b and the inner semiconducting layer 372 as in the formation of the insulating layer (e.g., the insulating layer 23 shown in FIG. 2A) of the power cable described above. Alternatively, the insulating layer 373 may be formed by a process that includes inserting the inner semiconducting layer 372-covered conductors 31a and 31b into a mold and then injecting the insulating resin composition into the mold.

Formation of Outer Semiconducting Layer

Figure 4E:
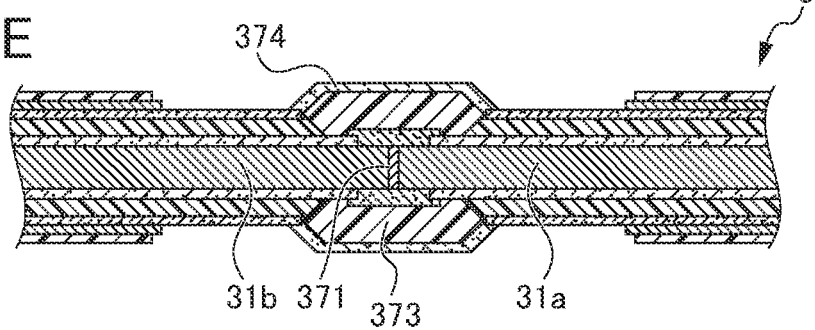

Subsequently, as shown in FIG. 4E, an outer semiconducting layer 374 is formed around the insulating layer 373. Similar to the inner semiconducting layer 372, the outer semiconducting layer 374 is formed using a semiconducting resin composition.

Similar to the inner semiconducting layer 372, the outer semiconducting layer 374 may be formed, for example, by molding a resin. Alternatively, before the connection portion 371 is formed, the conductors 31a and 31b may be inserted in a semiconducting, heat-shrinkable tube, and the tube may be shrunk by heating to form the outer semiconducting layer 374 after the connection portion 371 is formed.

Cross-Linking Step

Subsequently, when the resin composition of the insulating layer 373 contains the cross-linking agent (B), the insulating layer 373-covered connection portion 371 is subjected to a cross-linking step that includes pressure heating under conditions at 300 kPa or more and 5,000 kPa or less and at 140° C. or more and 280° C. or less to cross-link polyethylene in the insulating layer 373. Thus, the modified polyethylene resin (A1) and the unmodified polyethylene resin (A2) are cross-linked so that the resin material of the insulating layer 373 has increased mechanical properties and heat resistance.

The cross-linking step may include pressure heating in a closed pressure vessel charged with pressurized gas. In the cross-linking step, the pressure heating is preferably performed at a pressure of 300 kPa or more, more preferably 400 kPa or more. In order to prevent the breaking of the seal of the closed portion of the pressure vessel, the pressure heating in the cross-linking step is preferably performed at a pressure of 5,000 kPa or less, more preferably 1,000 kPa or less.

The heating temperature in the cross-linking step is preferably 140° C. or more, more preferably 160° C. or more in order to facilitate the cross-linking reaction mediated by the cross-linking agent. In the cross-linking step, the heating temperature is preferably 280° C. or less, more preferably 260° C. or less in order to prevent the thermal decomposition of the polyethylene resin.

Formation of Metal Shielding Layer and Anticorrosive Sheath

A metal shielding layer and an anticorrosive sheath (both not shown) may be provided around the cross-linked insulating layer 373. The metal shielding layer may be made of, for example, lead, copper, or aluminum. The anticorrosive sheath may be made of, for example, polyvinyl chloride, polyethylene, or nylon.

EXAMPLES

Next, inventive examples and comparative examples are described to further clarify the advantageous effects of the present invention. It will be understood that such examples are not intended to limit the present invention.

Inventive Example 1

Preparation of Insulating Resin Composition

Base resins (A) in a total amount of 100 parts by mass were 5 parts by mass of maleic anhydride-modified polyethylene SCONA TSPE 1112 GALL (manufactured by BYK JAPAN K.K., melting point: 115-132° C., specific gravity: 0.89-0.94), corresponding to the modified polyolefin resin (A1), and 95 parts by mass of low-density polyethylene ZF30R (manufactured by Japan Polyethylene Corporation, melting point: 110° C., specific gravity: 0.92), corresponding to the unmodified polyolefin resin (A2).

To 100 parts by mass of the base resins (A) was added 0.2 parts by mass of a phosphorus antioxidant Irgafos P-EPQ (tetrakis(2,4-di-tert-butylphenyl)-biphenylenediphosphonite, manufactured by BASF), corresponding to the antioxidant (C). The resulting mixture was melted and kneaded into pellets using a single-screw extruder having a full flight screw with a Maddock type resin mixing portion at its intermediate portion (manufactured by IKG Corporation, L/D ratio: 25) at an extrusion temperature (kneading temperature) of 125° C.

At 90° C., 1.7 parts by mass of PERCUMYL D (dicumyl peroxide (DCP), manufactured by NOF Corporation, melting point: 40° C., decomposition temperature: 130° C.), corresponding to the cross-linking agent (B), was dry blended with the resulting pellets so that the melted DCP was absorbed into the pellets. As a result, an insulating resin composition (melting point: 110° C.) was obtained.

Formation of Sheet for Evaluation

The resulting insulating resin composition was extruded into a film with a thickness of 0.3 mm using a T die process at a die temperature of 130° C. In this process, 10 seconds after the extrusion of the insulating resin composition, the surface of the film was cooled to a temperature not higher than the melting point of the unmodified polyolefin resin (A2) by adjusting the temperature of and the distance to the roll with which the film came into first contact.

The resulting film was pressure heated by being pressed at a temperature of 170° C. and a pressure of 5,000 kPa for 30 minutes so that the modified polyolefin resin (A1) and the unmodified polyolefin resin (A2) were cross-linked. As a result, a 0.3 mm-thick sheet for evaluation was obtained, which included the cross-linked resin material.

The resulting sheet for evaluation was sliced. The resulting strip was subjected to metal staining with $RuO_4$ and then imaged using a transmission electron microscope (TEM) (HT7700 manufactured by Hitachi High Technologies Co., Ltd.) so that the sea-island structure of the resin was imaged. The sea-island structure was imaged at a microscope magnification of 10,000× with the contrast controlled such that the sea-island structure was made clear in the cross-section of the resin. The resulting image was analyzed using image analysis software ImageJ to determine the average diameter of regions of the island phase in the image. The diameter of each region of the island phase was determined using ImageJ for image processing. The diameter of each region of the island phase was determined as the arithmetic average of the maximum and minimum sizes, which were the maximum and minimum of the sizes measured over the entire circumference (360 degrees) of the island phase region. The number of regions of the island phase with diameters of 0.5 µm to 2.0 µm was counted in any observation area with a length of 10 µm and a width of 10 µm in the resulting image, and the sum of the areas of all regions of the island phase was calculated. In this regard, regions of the island phase spaced at least 1/50 of the average phase size apart from each other were determined to be independent from each other when the analysis was performed.

In the sheet for evaluation, the average diameter of the regions of the island phase determined in this way was 1 µm in the sea-island structure. The number of the regions of the island phase with diameters of 0.5 µm to 2.0 µm in the 10 µm×10 µm observation area was 6, and all regions of the island phase had a total area of 5 µm².

Inventive Example 2

A sheet for evaluation including a cross-linked resin was obtained as in Inventive Example 1, except that 0.2 parts by mass of a phenolic antioxidant Irganox 1010 (pentaerythritol tetrakis[3-(3',5'-di-tert-butyl-4'-hydroxyphenyl)propionate], manufactured by Ciba Specialty Chemicals Corporation), corresponding to the antioxidant (C), was added to 100 parts by mass of the base resins (A). In the resulting sheet for evaluation, the average diameter of the regions of the island phase in the sea-island structure was determined to be 1 µm by the same method as in Inventive Example 1. The number of the regions of the island phase with diameters of 0.5 µm to 2.0 µm in the 10 µm×10 µm observation area was 5, and all regions of the island phase had a total area of 5 µmt.

Inventive Example 3

An insulating resin composition was prepared as in Inventive Example 1, except that base resins (A) in a total amount of 100 parts by mass were 5 parts by mass of ethylene-methacrylic acid copolymer Himilan 1705Zn (manufactured by Mitsui DuPont Polychemical Co., Ltd., methacrylic acid content: 15% by mass, melting point: 91° C., specific gravity: 0.95), corresponding to the modified polyolefin resin (A1), and 95 parts by mass of low-density polyethylene ZF30R (manufactured by Japan Polyethylene Corporation, melting point: 110° C., specific gravity: 0.92), corresponding to the unmodified polyolefin resin (A2).

A sheet for evaluation including a cross-linked resin was obtained as in Inventive Example 1, except that 3 seconds after the extrusion of the resulting insulating resin composition, the surface of the film was cooled to a temperature not higher than the melting point of the unmodified polyolefin resin (A2). In the resulting sheet for evaluation, the average diameter of the regions of the island phase in the sea-island structure was determined to be 2 µm by the same method as in Inventive Example 1. The number of the regions of the island phase with diameters of 0.5 µm to 2.0 µm in the 10 µm×10 µm observation area was 5, and all regions of the island phase had a total area of 6 µm².

Inventive Example 4

Base resins (A) in a total amount of 100 parts by mass were 30 parts by mass of maleic anhydride-modified polypropylene Umex 100TS (manufactured by Sanyo Chemical Industries Ltd., melting point: 136° C., specific gravity: 0.89), corresponding to the modified polyolefin resin (A1), and 70 parts by mass of polypropylene (melting point: 167° C., specific gravity: 0.925, melt index (MI): 0.8), corresponding to the unmodified polyolefin resin (A2).

To 100 parts by mass of the base resins (A) was added 0.2 parts by mass of a phosphorus antioxidant Irgafos P-EPQ (tetrakis(2,4-di-tert-butylphenyl)-biphenylenediphosphonite, manufactured by BASF), corresponding to the antioxidant (C). The resulting mixture was melted and kneaded into pellets using a single-screw extruder having a full flight screw with a Maddock type resin mixing portion at its intermediate portion (manufactured by IKG Corporation, L/D ratio: 28) at an extrusion temperature (kneading temperature) of 220° C. As a result, an insulating resin composition (melting point: 164° C.) was obtained. The resulting insulating resin composition was extruded by a T die process as in Inventive Example 1. The resulting film was used as a sheet for evaluation.

In the resulting sheet for evaluation, the average diameter of the regions of the island phase in the sea-island structure was determined to be 2 μm by the same method as in Inventive Example 1. The number of the regions of the island phase with diameters of 0.5 μm to 2.0 μm in the 10 μm×10 μm observation area was 20, and all regions of the island phase had a total area of 20 μm².

Comparative Example 1

A sheet for evaluation including a cross-linked resin was obtained as in Inventive Example 1, except that the modified polyolefin resin (A1) was not used, low-density polyethylene ZF30R (manufactured by Japan Polyethylene Corporation, melting point: 110° C., specific gravity: 0.92), corresponding to the unmodified polyolefin resin (A2), was used as the base resin (A) in an amount of 100 parts by mass and that a full flight screw (manufactured by IKG Corporation, L/D ratio: 25) with no resin mixing portion was used when the raw material was melted and kneaded. The resulting sheet for evaluation had no sea-island structure.

Comparative Example 2

A sheet for evaluation including a cross-linked resin was obtained as in Inventive Example 1, except that a full flight screw (manufactured by IKG Corporation, L/D ratio: 16) with no resin mixing portion was used when the raw material was melted and kneaded. In the resulting sheet for evaluation, the average diameter of the regions of the island phase in the sea-island structure was determined to be 13 μm by the same method as in Inventive Example 1. The number of the regions of the island phase with diameters of 0.5 μm to 2.0 μm in the 10 μm×10 μm observation area was 0, and all regions of the island phase had a total area of 25 μm².

Comparative Example 3

A sheet for evaluation including a cross-linked resin was obtained as in Inventive Example 1, except that a full flight screw (manufactured by IKG Corporation, L/D ratio: 25) with no resin mixing portion was used when the raw material was melted and kneaded and that 18 seconds after the extrusion of the insulating resin composition, the surface of the film was cooled to a temperature not higher than the melting point of the unmodified polyolefin resin (A2) by adjusting the temperature of and the distance to the roll with which the film came into first contact. In the resulting sheet for evaluation, the average diameter of the regions of the island phase in the sea-island structure was determined to be 3 μm by the same method as in Inventive Example 1. The number of the regions of the island phase with diameters of 0.5 μm to 2.0 μm in the 10 μm×10 μm observation area was 4, and all regions of the island phase had a total area of 4 μm².

Inventive Example 5

The insulating resin composition obtained in Inventive Example 1 was used to form an insulating layer. A semiconducting resin composition including a cross-linkable resin, electrically-conductive carbon black, and a cross-linking agent was used to form inner and outer semiconducting layers.

The semiconducting resin composition for forming an inner semiconducting layer, the insulating resin composition of Inventive Example 1 for forming an insulating layer, and the semiconducting resin composition for forming an outer semiconducting layer were co-extruded to form three layers on the outer circumferential surface of a conductor with a cross-sectional area of 2,000 mm² and a length of 25 m. In this process, the resin thickness for the inner semiconducting layer, the resin thickness for the insulating layer, and the resin thickness for the outer semiconducting layer were set to 1.5 mm, 15 mm, and 1.5 mm, respectively, and the die temperature was set to 128° C. Subsequently, 10 seconds after the extrusion of the resins, the resins were cooled such that the surface of the extruded resin reached a temperature not higher the melting point of the unmodified polyolefin resin (A2).

Subsequently, the product was heated at a pressure of 784 kPa and a temperature of 220° C. for 2 hours in a nitrogen atmosphere so that the insulating resin composition of Inventive Example 1 for an insulating layer was cross-linked and an inner semiconducting layer, an insulating layer, and an outer semiconducting layer were formed on the outer circumferential surface of the conductor.

A metal shielding layer and an anticorrosive sheath were provided around the formed outer semiconducting layer, so that the power cable 2 shown in FIGS. 2A and 2B was obtained. The insulating layer 23 of the resulting power cable was used as a sheet for evaluation. In the sheet, the average diameter of the regions of the island phase in the sea-island structure was determined to be 1 μm by the same method as in Inventive Example 1. The number of the regions of the island phase with diameters of 0.5 μm to 2.0 μm in the 10 μm×10 μm observation area was 10, and all regions of the island phase had a total area of 11 μm².

Inventive Example 6

A power cable was obtained as in Inventive Example 5, except that the resin thickness for the inner semiconducting layer and the resin thickness for the outer semiconducting layer were respectively set to 2 mm and 2.5 mm when the semiconducting resin composition for the inner semiconducting layer, the insulating resin composition of Inventive Example 1 for the insulating layer, and the semiconducting resin composition for the outer semiconducting layer were co-extruded into three layers. The insulating layer of the resulting power cable was used as the sheet for evaluation. In the sheet for evaluation, the average diameter of the regions of the island phase in the sea-island structure was determined to be 2 μm by the same method as in Inventive Example 1. The number of the regions of the island phase with diameters of 0.5 μm to 2.0 μm in the 10 μm×10 μm observation area was 7, and all regions of the island phase had a total area of 8 μm².

Inventive Example 7

An insulating tape was prepared using the insulating resin composition obtained in Inventive Example 1. The insulating resin composition was extruded into a 100 μm-thick film using an inflation film molding machine (manufactured by PLACO Co., Ltd.) at a die temperature of 130° C., and 10 seconds after the extrusion, the surface of the film was cooled to a temperature not higher than the melting point of the unmodified polyolefin resin (A2). The resulting film was subjected to slitting so that an insulating tape with a width of 20 mm and a thickness of 100 μm (the same as the thickness of the film) was obtained. The resulting insulating tape was used as the sheet for evaluation. In the sheet for evaluation, the average diameter of the regions of the island phase in the sea-island structure was determined to be 1 μm by the same method as in Inventive Example 1. The number of the regions of the island phase with diameters of 0.5 μm to 2.0 μm in the 10 μm×10 μm observation area was 6, and all regions of the island phase had a total area of 6 μm².

Comparative Example 4

An insulating tape was obtained as in Inventive Example 7, except that the insulating resin composition used was the same as in Inventive Example 2, the screw used in melting and kneading the raw material was a full flight screw (manufactured by IKG Corporation, L/D ratio: 24) with no resin mixing portion, and 16 seconds after the extrusion of the insulating resin composition, the surface of the film was cooled to a temperature not higher than the melting point of the unmodified polyolefin resin (A2). The resulting insulating tape was used as the sheet for evaluation. In the sheet for evaluation, the average diameter of the regions of the island phase in the sea-island structure was determined to be 5 μm by the same method as in Inventive Example 1. The number of the regions of the island phase with diameters of 0.5 μm to 2.0 μm in the 10 μm×10 μm observation area was 2, and all regions of the island phase had a total area of 15 μm².

Inventive Example 8

Two power cables prepared as in Inventive Example 5 were used. As shown in FIG. 4A, the power cables were subjected to cutting and processing so that an end portion of each of the conductors 31a and 31b was exposed. One of the power cables was then inserted in a 1 mm-thick shrinkable tube for forming an outer semiconducting layer. Subsequently, as shown in FIG. 4B, the end portions of the conductors 31a and 31b were conductively connected to each other to form a connection portion 371, and then as shown in FIG. 4C, a semiconducting tape was wound to cover the exposed portions of the conductors 31a and 31b so that a 1 mm-thick inner semiconducting layer 372 was formed. The insulating tape of Inventive Example 7 was then wound to cover the outer circumference of the formed inner semiconducting layer 372 so that a 20 mm-thick insulating layer 373 was formed. The same shrinkable tube was covered on the insulating layer 373 to form an outer semiconducting layer 374.

Subsequently, the product was heated at a pressure of 784 kPa and a temperature of 220° C. for 3 hours in a nitrogen atmosphere so that the insulating resin composition in the insulating tape was cross-linked and an inner semiconducting layer, an insulating layer, and an outer semiconducting layer were formed on the outer circumferential surface of the conductor.

A metal shielding layer and an anticorrosive sheath were provided around the formed outer semiconducting layer so that the power cables were connected into a single power cable with the structure shown in FIGS. 3A to 3C. The insulating layer 372 covering the connection portion 371 of the resulting power cable was used as the sheet for evaluation. In the sheet for evaluation, the average diameter of the regions of the island phase in the sea-island structure was determined to be 1 μm by the same method as in Inventive Example 1. The number of the regions of the island phase with diameters of 0.5 μm to 2.0 μm in the 10 μm×10 μm observation area was 8, and all regions of the island phase had a total area of 7 μm².

Comparative Example 5

An insulating tape was prepared as in Inventive Example 7, except that the screw used in melting and kneading the raw material was a full flight screw (manufactured by IKG Corporation, L/D ratio: 24) with no resin mixing portion and that 16 seconds after the extrusion of the insulating resin composition, the surface of the film was cooled to a temperature not higher than the melting point of the unmodified polyolefin resin (A2). The resulting insulating tape was used in connecting two power cables into a single power cable as in Inventive Example 8. The insulating layer covering the connection portion of the resulting power cable was used as the sheet for evaluation. In the sheet for evaluation, the average diameter of the regions of the island phase in the sea-island structure was determined to be 6 μm by the same method as in Inventive Example 1. The number of the regions of the island phase with diameters of 0.5 μm to 2.0 μm in the 10 μm×10 μm observation area was 1, and all regions of the island phase had a total area of 21 μm².

Evaluation of Electric Field Multiplication Factor

The sheets for evaluation, the insulating tapes, and the insulating layers of the power cables (in the case of Inventive Example 8 and Comparative Example 5, the insulating layer covering the connection portion of the power cable), obtained in the inventive and comparative examples shown above, were evaluated for electric field multiplication factor using pulsed electrostatic stress method.

The sheets for evaluation, the insulating tapes, and the insulating layers to be measured were cut into samples 50 mm in length, 50 mm in width, and 0.3 mm in thickness. Each sample was sandwiched between the upper and lower electrodes of a space charge measurement system (standard PEA-ST, manufactured by Five Lab Co., Ltd.), and a DC electric field with 30 kV/mm negative polarity was continuously applied to the cross-linked sheet at a temperature of 90° C. for 48 hours, when the maximum electric field was measured. The electric field multiplication factor was defined as the ratio of the measured maximum electric field to the applied electric field. The insulating tape of Inventive Example 9 was shaped into a sample piece 50 mm in length, 50 mm in width, and 0.3 mm in thickness, when the electric field multiplication factor was determined. Since the amount of accumulated space charges should be preferably as small as possible, the value of the electric field multiplication factor determined in this way should be preferably as small as possible and more preferably 130% or less. The results are shown in Tables 1 and 2.

TABLE 1

|  |  |  | Inventive Example 1 | Inventive Example 2 | Inventive Example 3 | Inventive Example 4 | Inventive Example 5 | Inventive Example 6 | Inventive Example 7 | Inventive Example 8 |
|---|---|---|---|---|---|---|---|---|---|---|
| Components (parts by mass) of resin composition | (A1) Modified polyolefin | | | | | | | | | |
| | Modified polyethylene | SCONA TSPE 1112 GALL | 5 | 5 | | | 5 | 5 | 5 | 5 |
| | Modified polyethylene | Himilan 1705 Zn | | | 5 | | | | | |
| | Modified polypropylene | Umex 100TS | | | | 30 | | | | |
| | (A1) Total amount | | 5 | 5 | 5 | 30 | 5 | 5 | 5 | 5 |
| | (A2) Unmodified polyolefin | | | | | | | | | |
| | Low-density polyethylene | ZF30A | 95 | 95 | 95 | | 95 | 95 | 95 | 95 |
| | Polypropylene | (melting point: 167° C./ specific gravity: 0.925, MI: 0.8) | | | | 70 | | | | |
| | (A2) Total amount | | 95 | 95 | 95 | 70 | 95 | 95 | 95 | 95 |
| | (A2)/(A1) ratio | | 19 | 19 | 19 | 2.3 | 19 | 19 | 19 | 19 |
| | (A) Total amount | | 100 | 100 | 100 | 100 | 100 | 100 | 100 | 100 |
| | (B) Cross-linking agent | | | | | | | | | |
| | Cross-linking agent | PERCUMYL D | 1.7 | 1.7 | 1.7 | | 1.7 | 1.7 | 1.7 | 1.7 |
| | (C) Antioxidant | | | | | | | | | |
| | Antioxidant | Irgafos P-EPQ | 0.2 | | 0.2 | 0.2 | 0.2 | 0.2 | | |
| | | Irganox 1010 | | 0.2 | | | | | 0.2 | 0.2 |
| | (C) Total amount | | 0.2 | 0.2 | 0.2 | 0.2 | 0.2 | 0.2 | 0.2 | 0.2 |
| | Content of (C) antioxidant based on 100 parts by mass of (B) cross-linking agent | | 8.5 | 8.5 | 8.5 | 0.0 | 8.5 | 8.5 | 8.5 | 8.5 |
| Production conditions | Kneading conditions | L/D ratio | 25 | 25 | 25 | 28 | 26 | 26 | 18 | 18 |
| | | Screw type* | M | M | M | M | M | M | M | M |
| | | Extrusion temperature (° C.) | 125 | 125 | 125 | 220 | 125 | 125 | 125 | 125 |
| | Cooling time (seconds) after extrusion | | 10 | 10 | 3 | 10 | 10 | 10 | 10 | 10 |
| | Inner semiconducting layer thickness (α) (mm) | | — | — | — | — | 1.5 | 2 | — | — |
| | Insulating layer thickness (mn) | | — | — | — | — | 15 | 15 | — | — |
| | Outer semiconducting layer thickness (β) (mm) | | — | — | — | — | 1.5 | 2.5 | — | — |
| | (α) + (β) | | — | — | — | — | 3 | 4.5 | — | — |
| | Pressure heating | Pressure (kPa) | 5000 | 5000 | 5000 | — | 784 | 784 | — | 784 |
| | | Temperature (° C.) | 170 | 170 | 170 | — | 220 | 220 | — | 220 |
| Sea-island structure of resin composition | Presence or absence of sea-island structure | | Present | Present | Present | Present | Present | Present | Present | Present |
| | Island phase (second phase) average diameter (μm) | | 1 | 1 | 2 | 2 | 1 | 2 | 1 | 1 |
| | Number of island phase regions with diameters of 0.5 μm to 2.0 μm in 10 μm (length) × 10 μm (width) observation area | | 6 | 5 | 5 | 20 | 10 | 7 | 6 | 8 |
| | Total area (μm²) of all island phase regions in 10 nm (length) × 10 μm (width) observation area | | 5 | 5 | 6 | 20 | 11 | 8 | 6 | 7 |

TABLE 1-continued

|  |  | Inventive Example 1 | Inventive Example 2 | Inventive Example 3 | Inventive Example 4 | Inventive Example 5 | Inventive Example 6 | Inventive Example 7 | Inventive Example 8 |
|---|---|---|---|---|---|---|---|---|---|
| Evaluation result | Evaluation target | Sheet | Sheet | Sheet | Sheet | Cable insulating layer | Cable insulating layer | Insulating tape | Insulating layer of connection portion |
|  | Electric field multiplication factor (%) | 120 | 106 | 110 | 111 | 110 | 126 | 105 | 107 |

*As for screw type, "F" indicates having no resin mixing portion, and "M" indicates having Maddock type resin mixing portion.

TABLE 2

|  |  |  | Comparative Example 1 | Comparative Example 2 | Comparative Example 3 | Comparative Example 4 | Comparative Example 5 |
|---|---|---|---|---|---|---|---|
| Components (parts by mass) of resin composition | (A1) Modified polyolefin |  |  |  |  |  |  |
|  | Modified polyethylene | SCONA TSPE 1112 GALL |  | 5 | 5 | 5 | 5 |
|  | Modified polyethylene | Himilan 1705 Zn |  |  |  |  |  |
|  | Modified polypropylene | Umex 100TS |  |  |  |  |  |
|  | (A1) Total amount |  | 0 | 5 | 5 | 5 | 5 |
|  | (A2) Unmodified polyolefin |  |  |  |  |  |  |
|  | Low-density polyethylene | ZF30A | 100 | 95 | 95 | 95 | 95 |
|  | Polypropylene | (melting point: 167° C./ specific gravity: 0.925, MI: 0.8) |  |  |  |  |  |
|  | (A2) Total amount |  | 100 | 95 | 95 | 95 | 95 |
|  | (A2)/(A1) ratio |  | — | 19 | 19 | 19 | 19 |
|  | (A) Total amount |  | 100 | 100 | 100 | 100 | 100 |
|  | (B) Cross-linking agent |  |  |  |  |  |  |
|  | Cross-linking agent | PERCUMYL D | 1.7 | 1.7 | 1.7 | 1.7 | 1.7 |
|  | (C) Antioxidant |  |  |  |  |  |  |
|  | Antioxidant | Irgafos P-EPQ | 0.2 | 0.2 | 0.2 |  | 0.2 |
|  |  | Irganox 1010 |  |  |  | 0.2 |  |
|  | (C) Total amount |  | 0.2 | 0.2 | 0.2 | 0.2 | 0.2 |
|  | Content of (C) antioxidant based on 100 parts by mass of (B) cross-linking agent |  | 8.5 | 8.5 | 8.5 | 8.5 | 6.5 |
| Production conditions | Kneading conditions | L/D ratio | 25 | 16 | 25 | 24 | 24 |
|  |  | Screw type* | F | F | F | F | F |
|  |  | Extrusion temperature (° C.) | 125 | 125 | 125 | 125 | 125 |
|  | Cooling time (seconds) after extrusion |  | 10 | 10 | 18 | 16 | 16 |
|  | Inner semiconducting layer thickness (α) (mm) |  | — | — | — | — | — |
|  | Insulating layer thickness (mn) |  | — | — | — | — | — |
|  | Outer semiconducting layer thickness (β) (mm) |  | — | — | — | — | — |
|  | (α) − (β) |  | — | — | — | — | — |
|  | Pressure heating | Pressure (kPa) | 5000 | 5000 | 5000 | — | 784 |
|  |  | Temperature (° C.) | 170 | 170 | 170 | — | 220 |

TABLE 2-continued

|  |  | Comparative Example 1 | Comparative Example 2 | Comparative Example 3 | Comparative Example 4 | Comparative Example 5 |
|---|---|---|---|---|---|---|
| Sea-island structure of resin composition | Presence or absence of sea-island structure | Absent | Present | Present | Present | Present |
|  | Island phase (second phase) average diameter (μm) | — | 13 | 3 | 5 | 6 |
|  | Number of island phase regions with diameters of 0.5 μm to 2.0 μm in 10 μm (length) × 10 μm (width) observation area | 0 | 0 | 4 | 2 | 1 |
|  | Total area (μm$^2$) of all island phase regions in 10 nm (length) × 10 μm (width) observation area | 0 | 25 | 4 | 15 | 21 |
| Evaluation result | Evaluation target | Sheet | Sheet | Sheet | Insulating tape | Insulating layer of connection portion |
|  | Electric field multiplication factor (%) | 162 | 175 | 146 | 140 | 149 |

*As for screw type, "F" indicates having no resin mixing portion, and "M" indicates having Maddock type resin mixing portion.
(Note)
The underline in the table indicates that the underlined value is out of the appropriate range according to the present invention or that the evaluation result does not reach the acceptable level for inventive examples.

The evaluation results in Tables 1 and 2 show that the sheets for evaluation, the insulating tapes, and the insulating layers, obtained in Inventive Examples 1 to 8, have an electric field multiplication factor of at most 130%, in which they each include at least a polyolefin resin modified with a specific molecule with a polar group, an unmodified polyolefin resin, and an antioxidant and have a sea-island structure with an island phase average diameter in the appropriate range according to the present invention.

The results demonstrate that the sheets for evaluation, the insulating tapes, and the insulating layers, obtained in Inventive Examples 1 to 8, are less vulnerable to breakdown.

On the other hand, the sheet of Comparative Example 1 for evaluation, which has no sea-island structure, has a high electric field multiplication factor not at the acceptable level.

The sheets of Comparative Examples 2 and 3 for evaluation, the insulating tape of Comparative Example 4, and the insulating layer covering the connection portion of the power cable of Comparative Example 5 each have a high electric field multiplication factor not at the acceptable level, because they have a sea-island structure with an island phase average diameter as high as more than 2 μm.

EXPLANATION OF REFERENCE NUMERALS

1: Insulating resin composition
11: First phase (sea phase)
12: Second phase (island phase)
2, 3, 30a, 30b: Power cable
21, 31a, 31b: Conductor
22, 32a, 32b: Inner semiconducting layer
23, 33a, 33b: Insulating layer
24, 34a, 34b: Outer semiconducting layer
25, 35a, 35b: Metal shielding layer
26, 36a, 36b: Sheath
20, 370: Composite coating
37: Connection structure
371: Connection portion
372: Inner semiconducting layer
373: Insulating layer
374: Outer semiconducting layer
4, 5: Screw
41, 51: Portion to be attached to extruder
42, 52: Full flight screw
43: Resin mixing portion
E1, E2: Length of exposed conductor portion of power cable
D: Screw diameter
L: Screw length

The invention claimed is:

1. An insulating resin composition comprising at least: a base resin; and an antioxidant, the base resin comprising: a polyolefin resin modified with a polar group-containing molecule; and an unmodified polyolefin resin,
  the polar group-containing molecule, with which the polyolefin resin is modified, being at least one selected from an unsaturated dicarboxylic acid, an unsaturated dicarboxylic acid anhydride, and an unsaturated dicarboxylic acid anhydride derivative,
  the base resin having what is called a sea-island structure comprising: a first phase comprising the unmodified polyolefin resin; and a second phase provided in the first phase and comprising the modified polyolefin resin, the second phase having an average diameter of 2 μm or less.

2. An insulating tape for use in forming an insulating layer for a power cable, the insulating tape comprising: the insulating resin composition according to claim 1 as a raw material,
  the insulating tape having a thickness in a range of 30 μm or more and 250 μm or less and a width in a range of 3 mm or more and 40 mm or less.

3. A power cable comprising:
  a conductor; and
  a composite coating on an outer circumference of the conductor, the composite coating comprising:
    an inner semiconducting layer comprising a first electrically-conductive resin;
    an insulating layer made from the insulating resin composition according to claim 1 as a raw material and comprising a cross-linking reaction product of at least the modified polyolefin resin in the second phase and a cross-linking reaction product of at least the unmodified polyolefin resin in the first phase; and
    an outer semiconducting layer comprising a second electrically-conductive resin, the inner semiconducting layer, the insulating layer, and the outer semiconducting layer being stacked in order on the outer circumference of the conductor.

4. The power cable according to claim 3, wherein the inner semiconducting layer and the outer semiconducting layer have a total thickness of 5 mm or less.

5. A power cable comprising:
a connection structure comprising:
a connection portion; and
a composite coating on an outer circumference of the connection portion,
the connection portion comprising exposed end portions of conductors of a plurality of power cables, the exposed end portions being conductively connected together,
the composite coating comprising:
an inner semiconducting layer comprising a first electrically-conductive resin;
an insulating layer made from the insulating resin composition according to claim 1 as a raw material and comprising a cross-linking reaction product of at least the modified polyolefin resin in the second phase and a cross-linking reaction product of at least the unmodified polyolefin resin in the first phase; and
an outer semiconducting layer comprising a second electrically-conductive resin, the inner semiconducting layer, the insulating layer, and the outer semiconducting layer being stacked in order on the outer circumference of the connection portion.

6. The power cable according to claim 5, wherein the insulating layer comprises an insulating layer-forming insulating tape that has a thickness in a range of 30 μm or more and 250 μm or less and a width in a range of 3 mm or more and 40 mm or less, is wound around an outer circumference of the inner semiconducting layer, and has undergone cross-linking.

7. The power cable according to claim 6, wherein the inner semiconducting layer and the outer semiconducting layer have a total thickness of 5 mm or less.

8. The power cable according to claim 5, wherein the inner semiconducting layer and the outer semiconducting layer have a total thickness of 5 mm or less.

9. A method of producing an insulating tape for use in forming an insulating layer for a power cable, the method comprising:
extruding the insulating resin composition according to claim 1 into a film;
cooling a surface of the film to a temperature equal to or lower than a melting point of the unmodified polyolefin resin within 15 seconds after the extrusion of the insulating resin composition; and
subjecting the film to slitting to form a tape.

10. A method of forming an insulating layer on an outer surface of a connection portion of a power cable, the method comprising:
depositing the insulating resin composition according to claim 1 on an outer circumference of a connection portion to form an insulating layer on an outer surface of the connection portion, the connection portion comprising exposed end portions of conductors of a plurality of power cables, the exposed end portions being conductively connected together; and
subjecting the connection portion with the insulating layer to pressure heating under conditions at 300 kPa or more and 1,000 kPa or less and at 140° C. or more and 280° C. or less to cross-link the unmodified polyolefin resin and the modified polyolefin resin in the base resin in the insulating layer.

11. The method according to claim 10, wherein the insulating layer is formed on the outer circumference of the connection portion by winding an insulating layer-forming insulating tape comprising the insulating resin composition as a raw material and having a thickness in a range of 30 μm or more and 250 μm or less and a width in a range of 3 mm or more and 40 mm or less.

12. A method of producing a power cable, the method comprising: stacking an inner semiconducting layer, an insulating layer, and an outer semiconducting layer in order on an outer circumference of a conductor and cross-linking at least the insulating layer, wherein
the insulating layer is stacked by extruding the insulating resin composition according to claim 1 onto an outer circumference of the inner semiconducting layer,
a surface of the stacked insulating layer is cooled to a temperature equal to or lower than a melting point of the unmodified polyolefin resin within 15 seconds after the extrusion onto the outer circumference of the inner semiconducting layer, and
the insulating layer is cross-linked by subjecting the insulating layer to pressure heating under conditions at 300 kPa or more and 1,000 kPa or less and at 140° C. or more and 280° C. or less to cross-link the unmodified polyolefin resin and the modified polyolefin resin in the base resin in the insulating layer.

13. The insulating resin composition according to claim 1, wherein the sea-island structure includes 5 to 20 regions of the second phase with a diameter in a range of 0.5 μm to 2.0 μm within an observed area with a length of 10 μm and a width of 10 μm.

14. The insulating resin composition according to claim 13, wherein all regions of the second phase in the observed area have a total area of 20 μm$^2$ or less.

15. A method of producing an insulating resin composition, the method comprising:
adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated dicarboxylic acid anhydride derivative; and
kneading the unmodified polyolefin resin, the antioxidant, and the modified polyolefin resin to obtain a base resin that comprises a dilution of the modified polyolefin resin with the unmodified polyolefin resin and has what is called a sea-island structure comprising: a first phase comprising the unmodified polyolefin resin; and a second phase provided in the first phase and comprising the modified polyolefin resin, wherein the second phase has an average diameter of 2 μm or less.

16. A method of producing an insulating resin composition, the method comprising:
adding an unmodified polyolefin resin and an antioxidant to a polyolefin resin modified with at least one polar group-containing molecule selected from an unsaturated dicarboxylic acid, an unsaturated dicarboxylic acid anhydride, and an unsaturated di carboxylic acid anhydride derivative to prepare diluted polyolefin pellets comprising a base resin comprising a dilution of the modified polyolefin resin with the unmodified polyolefin resin; then adding a cross-linking agent to the diluted polyolefin pellets; and subjecting the cross-linking agent and the diluted polyolefin pellets to dry blending such that the base resin has what is called a sea-island structure comprising: a first phase comprising the unmodified polyolefin resin; and a second phase provided in the first phase and comprising the modified polyolefin resin and the second phase has an average diameter of 2 µn or less.

* * * * *